(12) United States Patent
Mumford et al.

(10) Patent No.: US 10,902,110 B2
(45) Date of Patent: Jan. 26, 2021

(54) USE OF AKA METHODS AND PROCEDURES FOR AUTHENTICATION OF SUBSCRIBERS WITHOUT ACCESS TO SIM CREDENTIALS

(71) Applicant: Ribbon Communications Operating Company, Inc., Westford, MA (US)

(72) Inventors: Keith A. Mumford, Grayshott (GB); Satish Agrawal, San Jose, CA (US); Mark Wallis, Woodland Hills, CA (US)

(73) Assignee: Ribbon Communications Operating Company, Inc., Westford, MA (US)

(*) Notice: Subject to any disclaimer, the term of this patent is extended or adjusted under 35 U.S.C. 154(b) by 0 days.

(21) Appl. No.: 16/569,529

(22) Filed: Sep. 12, 2019

(65) Prior Publication Data

US 2020/0004982 A1    Jan. 2, 2020

Related U.S. Application Data

(63) Continuation of application No. 15/584,271, filed on May 2, 2017, now Pat. No. 10,430,607.

(Continued)

(51) Int. Cl.
*G06F 21/31* (2013.01)
*G06F 21/44* (2013.01)
(Continued)

(52) U.S. Cl.
CPC ............ *G06F 21/44* (2013.01); *G06F 21/121* (2013.01); *G06F 21/445* (2013.01); *G06F 21/6236* (2013.01); *H04L 9/088* (2013.01); *H04L 9/0844* (2013.01); *H04L 9/3226* (2013.01); *H04L 63/0853* (2013.01); *H04W 12/0602* (2019.01); *H04W 12/0609* (2019.01); *G06F 21/00* (2013.01); *G06F 21/53* (2013.01); (Continued)

(58) Field of Classification Search
CPC ....... H04W 12/06; H04W 4/20; H04W 60/00; G06F 21/10; G06F 21/31
See application file for complete search history.

(56) References Cited

U.S. PATENT DOCUMENTS

| 2009/0185691 | A1* | 7/2009 | Falk | H04L 63/06 380/279 |
| 2014/0051391 | A1* | 2/2014 | Torres | H04W 12/0608 455/411 |
| 2016/0277927 | A1* | 9/2016 | Lee | H04L 63/126 |

* cited by examiner

*Primary Examiner* — Olugbenga O Idowu
(74) *Attorney, Agent, or Firm* — Straub & Straub; Stephen T. Straub; Michael P. Straub

(57) ABSTRACT

Systems and methods which enable an authentication procedure to be used within the standard network security architecture to authenticate third party applications that are forbidden access to a particular secret key are disclosed. Third party smartphone applications that are unable to use SIM-based authentication due to being forbidden access to a SIM-based key are provided an alternate secret key for use in an EAP-AKA or EAP-SIM type procedure according to embodiments. An authentication server or other backend authentication infrastructure of embodiments requests authentication vectors from a backend system sharing the alternative secret key. Accordingly, the backend authentication platform of embodiments is adapted to know or detect that an application is using an alternative secret key (e.g., a secret key other than the SIM-based secret key) and to perform the appropriate procedure for the key type.

20 Claims, 13 Drawing Sheets

Related U.S. Application Data

(60) Provisional application No. 62/332,275, filed on May 5, 2016.

(51) Int. Cl.
| | |
|---|---|
| *G06F 21/62* | (2013.01) |
| *G06F 21/12* | (2013.01) |
| *H04L 9/08* | (2006.01) |
| *H04L 9/32* | (2006.01) |
| *H04L 29/06* | (2006.01) |
| *H04W 12/06* | (2009.01) |
| G06F 21/53 | (2013.01) |
| G06F 21/00 | (2013.01) |
| H04W 8/18 | (2009.01) |

(52) U.S. Cl.
CPC .............. *G06F 2221/2113* (2013.01); *G06F 2221/2129* (2013.01); *H04W 8/183* (2013.01)

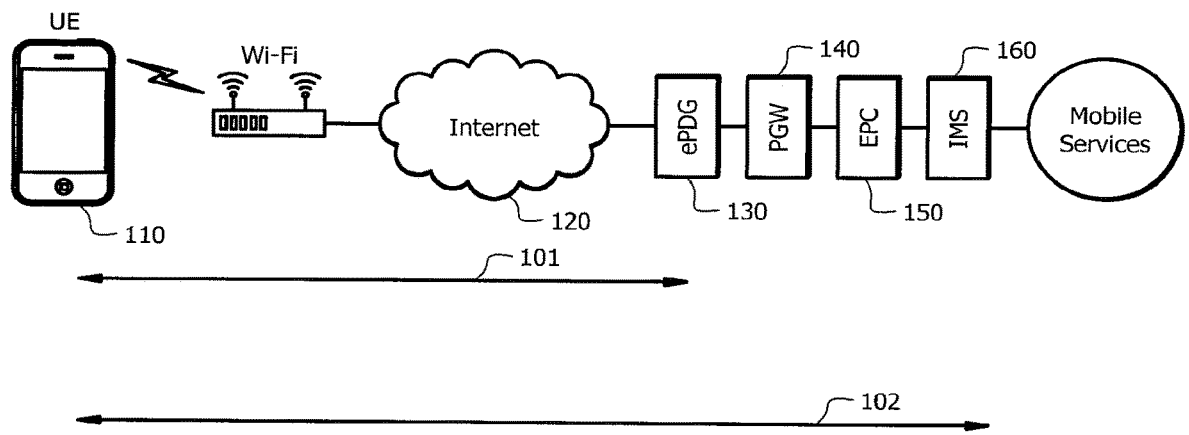
*FIG. 1*
*(Prior Art)*
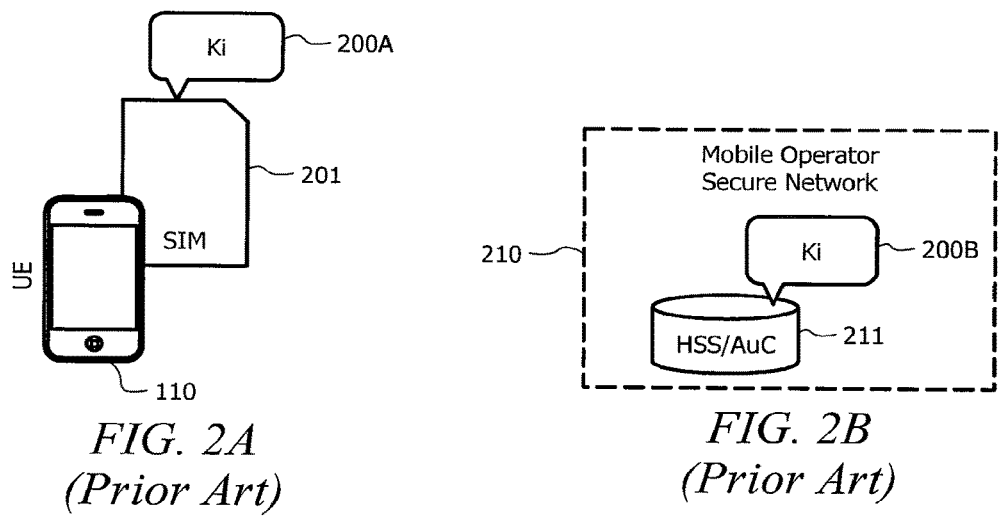
*FIG. 2A*
*(Prior Art)*
*FIG. 2B*
*(Prior Art)*

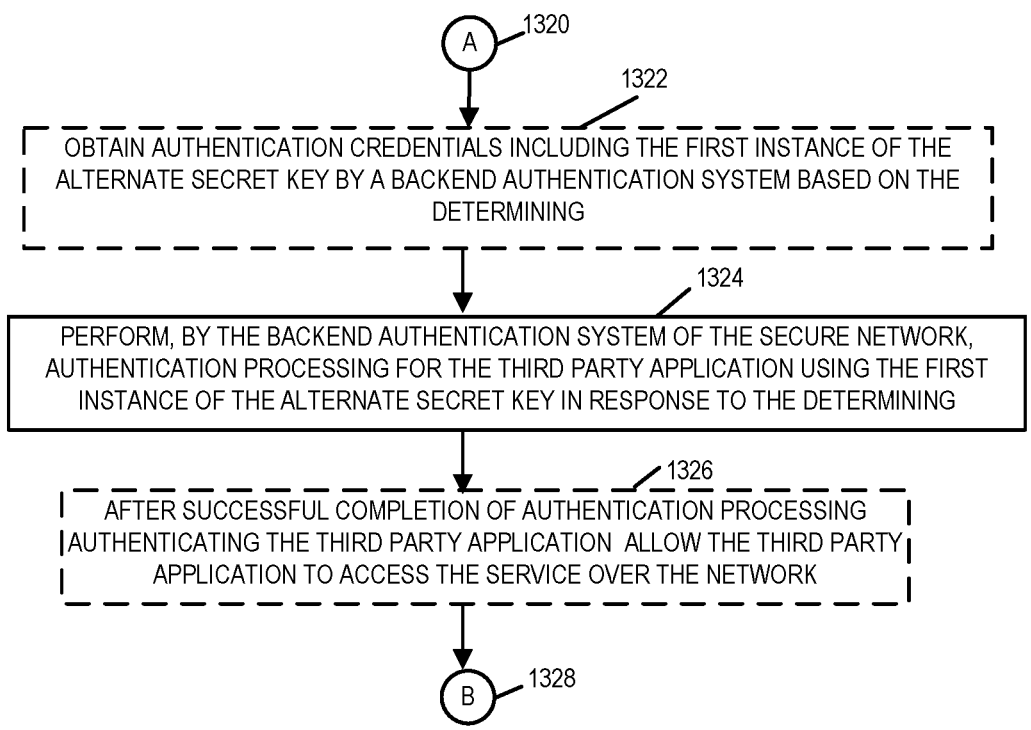

USE OF AKA METHODS AND PROCEDURES FOR AUTHENTICATION OF SUBSCRIBERS WITHOUT ACCESS TO SIM CREDENTIALS

RELATED APPLICATION

The present application is a continuation of U.S. patent application Ser. No. 15/584,271 filed on May 2, 2017 which published on Nov. 9, 2017 as U.S. Patent Application Publication No. US 2017-0323116 A1 and which claims priority to U.S. Provisional Patent Application Ser. No. 62/332,275 filed on May 5, 2016 each of the aforementioned documents being hereby expressly incorporated by reference in their entirety.

TECHNICAL FIELD

The invention relates generally to authentication procedures and, more particularly, to extensible authentication procedure support for third party or non-native applications or other applications that are forbidden access to a particular secret key used for authentication.

BACKGROUND OF THE INVENTION

The use of various processor-based devices has proliferated to the point of being nearly ubiquitous. Correspondingly, a variety of services, such as telephony services (e.g., wireless or cellular telephony and voice over Internet protocol (IP), including voice over WiFi), wireless media delivery services (e.g., multimedia on demand and streaming content channels), virtual private network (VPN) services (e.g., ecommerce sessions and enterprise network portals), etc., utilizing processor-based devices have become widely used.

Typically, the aforementioned services are facilitated through one or more client application on the processor-based devices. For example, smartphones (one very popular form of processor-based devices) may be provided from the manufacturer or service provider (e.g., mobile operator) to the user with one or more applications (referred to herein as native applications) for facilitating use of particular services, such as wireless telephony, electronic mail delivery, electronic commerce, etc. Additionally or alternatively, a user of the smartphone may download one or more applications (referred to herein as third party or non-native applications) for facilitating use of particular services, such as to provide an alternative application and/or service provider with respect to native applications, to provide access to additional services, etc.

The third generation partnership project (3GPP) specifies practices for access security mandating that devices that are allowed access to the mobile Evolved Packet Core (EPC) from an untrusted access network must be protected for data integrity and confidentiality of their signaling and media traffic through use of the IP security (IPsec) protocol suite. As used herein, an untrusted access network is a network for which a service provider (e.g., the mobile operator) has no direct control over and/or is outside of the mechanisms used by the service provider to provide security of communications (e.g., with respect to the mobile operator, the 3G or long term evolution (LTE) radio access network (RAN) is a trusted access network while the Internet is an untrusted access network).

One authentication method used with respect to smartphones to establish access security is the extensible authentication protocol-authentication key agreement (EAP-AKA) method. The EAP-AKA method described in RFC 4187 and RFC 5448 enables the establishment of an IP security (IPsec) Security Association (IPsec SA) between a smartphone and a network-located security element over an untrusted access network for providing a particular service with respect to the smartphone. The EAP-AKA procedure utilizes smartphone subscriber identity module (SIM) based credentials (e.g., SIM-based secret key) and standardized authentication algorithms to independently derive a set of session keys (e.g., master session key (MSK)) that initialize the IPsec SA at each end of the dialog. The IPsec SA subsequently protects the communications between the smartphone and the mobile network with respect to the service using data integrity checking and data encryption.

However, most modern smartphone Operating Systems intentionally limit access to the SIM for non-authorized use. Accordingly, it is generally not possible for third party applications to execute SIM-based algorithms to enable authentication of the device to the network. That is, SIM-based authentication is only available to applications that are given explicit permission to access the smartphone SIM for authentication purposes and thus third party applications (e.g., ANDROID applications downloaded from the GOOGLE PLAY STORE), in general, are unable to authenticate themselves to the network using the same SIM-based methods that the device operating system (OS) and/or native applications use because the SIM-based credentials, and thus the EAP-AKA methods, are not available to the third party applications.

Accordingly, alternate EAP methods are often used to establish an IPsec SA between the smartphone and network with respect to third party applications. These alternate EAP methods not only present their own set of issues, but also necessitate that multiple authentication methods must be simultaneously deployed (i.e., preventing standardizing on a single method for securing network access for applications that can use SIM-based authentication as well as those that cannot). Accordingly, service providers such as mobile operators are unable to minimize the number of secure entry points to the network and to reduce the number of disparate credentials and protocols that are otherwise required.

BRIEF SUMMARY OF THE INVENTION

The present invention is directed to systems and methods which enable an authentication procedure, such as an EAP-AKA type procedure, to be used within the standard network security architecture to authenticate third party applications that are forbidden access to a particular secret key, such as to establish an IPsec SA for third party applications. For example, third party smartphone applications that are unable to use SIM-based authentication due to being forbidden access to a SIM-based key are provided an alternate secret key for use in an EAP-AKA type procedure. In accordance with embodiments of the invention, a third party application may thus utilize the standard 3GPP network security architecture to perform authentication with an evolved Packet Data Gateway (ePDG) OR Security Gateway (SeGW) using the EAP-AKA protocol or EAP-SIM protocol that is otherwise typically used only for devices that can authenticate using SIM-based credential. Embodiments enable mobile operators to deploy an ePDG using EAP-AKA to secure access for devices and applications that do support SIM-based authentication in addition to those that do not support SIM-based authentication. Accordingly, the access network security architecture may be simplified and the diversity and complexity of systems that must otherwise be deployed may be reduced.

In operation according to embodiments, an authentication server or other backend authentication infrastructure requests authentication vectors from a backend system sharing the alternative secret key. Accordingly, the backend authentication platform of embodiments is adapted to know or detect that an application is using an alternative secret key (e.g., a secret key other than the SIM-based secret key) and to perform the appropriate procedure for the key type by retrieving and using the authentication vectors associated with alternative secret key as input to the authentication algorithm.

In some embodiments, authentication procedures other than those used with EAP-AKA or EAP-SIM are utilized. Embodiments support third party application authentication at additional secure entry points in the mobile network, such as in the use of IP multimedia subsystem-authentication key agreement (IMS-AKA) to gain access to the IP multimedia subsystem (IMS) domain. Further, authentication algorithms other than the AKA algorithm, may be, and in some embodiments are, used. For example, mutual authentication algorithms that execute at both the user device and in the network and derive a set of session key values at each peer in the procedure may be, and in some embodiments are, used. In operation according to embodiments, the alternative secret key is generated and stored in such a way that it is accessible to the third party application for which authentication is being performed, and may be used in the network to generate a set of authentication vectors. Moreover, a service session may be authenticated for the third party application with respect to a particular user device. Thus, to properly associate results of an authentication process to the service session according to embodiments, the identity reported by the application should be the proper identity of the user device (e.g., the international mobile subscriber identity (IMSI) for the SIM in the user device).

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the concepts and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which:

FIG. 1 shows the scope of the IPsec Security Associations established using the SIM-based EAP-AKA authentication process between UE and ePDG, and the SIM-based IMS-AKA authentication process between UE and IMS domain according to the prior art;

FIG. 2A shows storage of a secret key with respect to the SIM-based EAP-AKA authentication process of FIG. 1;

FIG. 2B shows storage of a secret key with respect to the SIM-based EAP-AKA authentication process of FIG. 1

FIG. 13 shows the combination of FIGS. 13A and 13B;

FIG. 13B shows a second part of a flowchart of an exemplary method in accordance with embodiments of the present invention.

DETAILED DESCRIPTION OF THE INVENTION

Figure 3:
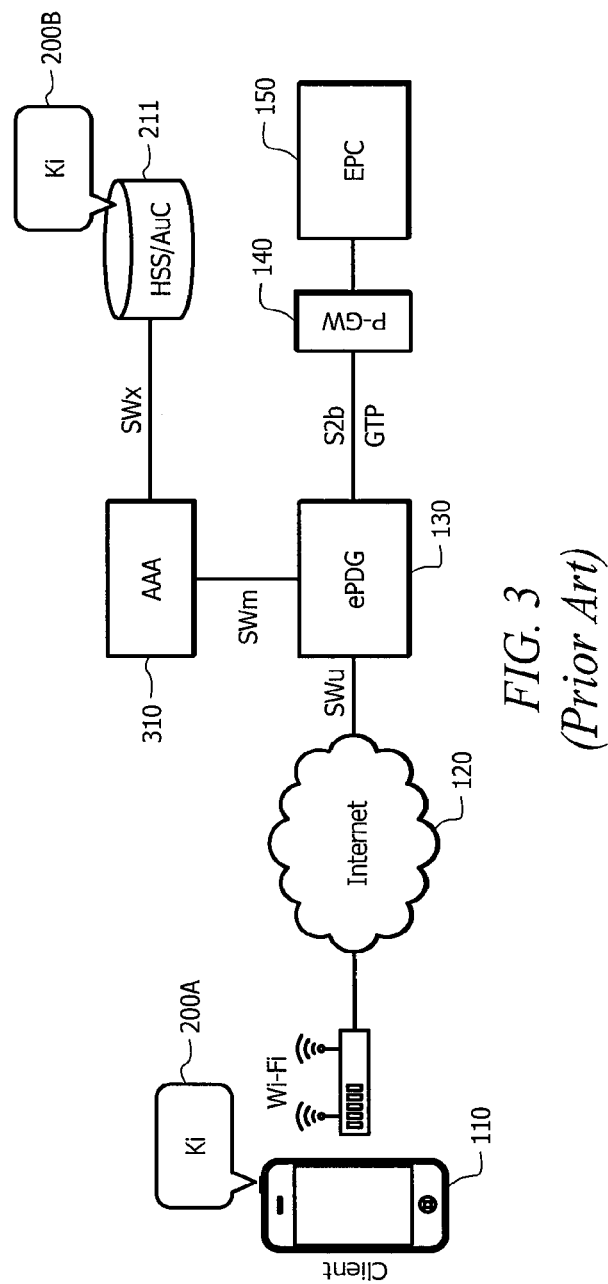
FIG. 3 shows further detail with respect to the backend infrastructure utilized by the SIM-based EAP-AKA authentication process of FIG. 1.

In understanding the concepts of the present invention for providing authentication with respect to third party applications or other applications that are forbidden access to a particular secret key used for authentication, it is helpful to review existing authentication procedures. Existing authentication procedures are widely deployed for providing protection of data integrity and confidentiality of signaling and media traffic with respect to processor-based devices (e.g., smartphones or other user equipment (UE)) provided communication services via an untrusted access network (e.g., the Internet) or a trusted access network (such as a 3GPP Radio Access Network (RAN)). For example, modern telephony, messaging and rich communications services networks that use the IP Multimedia System (IMS) framework may utilize SIM-based authentication at several different points in the access network.

Referring to FIG. 1, in operation of the above mentioned authentication procedures, user devices such as smartphone 110 that are attached to IMS core 160 over untrusted access network 120 (e.g., the Internet) are authenticated for access to mobile Evolved Packet Core (EPC) 150 using ePDG 130 (e.g., as may be coupled to EPC 150 via one or more device, such as provisioning gateway (PGW) 140), as represented by authentication exchange 101 of FIG. 1. The authentication exchange 101 is an EAP-SIM or EAP-AKA authentication exchange that establishes an IPsec Security Association between the UE 110 and the ePDG 130 to enable UE 110 access to EPC 150 over an encrypted transport. The act of authentication in this situation is primarily used to automatically and transparently derive the session keys that are used to establish an IPsec SA between the user device (smartphone 110 in the illustrated example) and the security element at the edge of the EPC (ePDG 130 in the illustrated example). The method to perform subscriber authentication to the ePDG 130 to enable access to the EPC 150 is through the use of SIM-based authentication such as either EAP-SIM (IETF RFC 4186) or EAP-AKA/EAP-AKA' (IETF RFC 4187 & RFC 5448, 3GPP TS 33.102 & TS 33.402) protocols. To gain access through EPC 150 to the IMS domain (IMS core 160) for telephony, video calling, messaging and other services the above mentioned authentication procedures separately authenticate the user device (e.g., smartphone 110) to IMS core 160, as represented by authentication exchange 102 of FIG. 1. The authentication exchange 102 implements an IMS-AKA authentication that establishes an IPsec Security Association between the UE 110 and the IMS Domain to enable the UE 110 to access IMS Services. Native applications use the IMS-AKA protocol (3GPP TS 24.229 & TS 33.203) to authenticate the user device to the IMS core using SIM-based credentials. The conventional EAP-AKA method is well known to those of skill in the art and is described in RFC 4187, 3GPP TS 33.102, TS 33.203 and TS 33.402, the contents of which are hereby incorporated herein by reference, and thus will not be described in detail herein.

It should be appreciated that in the example of FIG. 1, although access network 120 comprises an untrusted network (e.g., a network for which the mobile operator has no direct control over and/or is outside of the mechanisms used by the service provider to provide security of communications), ePDG 130 comprises a portion of the mobile operator's secure network. Moreover, PGW 140, EPC 150, and IMS 160, or portions thereof, may comprise a portion of the mobile operator's secure network or are otherwise part of a trusted network. The various mobile services provided via EPC 150 and/or IMS 160 may be provided by the mobile operator or other entities and may or may not be part of the mobile operator's secure network, depending upon the particular situation.

The most basic requirement for SIM-based authentication is that both the user device and the network must be pre-provisioned with a Secret Key, Ki, which has a different value per subscriber. The authentication procedure enables each peer in the process to be confident that the other party is in possession of the same Ki value for the subscriber that is attempting to authenticate. In the AKA method this provides a mutual authentication whereby the user device is authenticated to the network at the same time that the network is authenticated to the user device.

In providing such an authentication procedure it is vitally important that the Secret Key, Ki, for each subscriber is known only within the SIM containing the subscriber credentials and to the network or other authorized entity. Therefore, the Secret Key, Ki, is held very tightly and never divulged. As shown in FIG. 2A, in exemplary smartphone 110, Ki 200A is held securely in SIM 201 together with the algorithm that executes the AKA method such that it is impossible for any outside party to gain access to the value of Ki. As shown in FIG. 2B, corresponding Ki 200B is held very securely in authentication center (AuC) 211, as may be implemented within the mobile operator's Home Location Register (HLR) or Home Subscriber System (HSS), of mobile operator secure network 210. The instances of the Secret Keys, Ki, are typically initially deployed through an operator purchasing SIMs from a vendor having their respective keys thereon. The operator may then enter the details of those SIMs, including a corresponding instance of the Secret Key, Ki, into the operator's authentication center, thereafter distributing the SIMs to users for their use.

In the conventional EAP-AKA SIM-based authentication method the client application is the supplicant, the ePDG acts as the authenticator, and an AAA (Authentication Authorization and Accounting) server acts as the backend EAP authentication server. Such a configuration is extensible in the sense that the network security element (here the ePDG) is handing off the authentication of the user device to backend authentication infrastructure (here the AAA server), whereby the network security element essentially acts as a gate and the backend authentication infrastructure acts as a gatekeeper. This configuration is shown in FIG. 3, wherein AAA server 310 is shown coupled between ePDG 130 and AuC 211. It should be understood that EAP-AKA requires that a mutual authentication take place between the EAP peer (e.g., the client application) and the EAP authentication server (e.g., the AAA server) by use of an algorithm that utilizes, as one of the inputs, the Secret Key, Ki, for the subscriber identity (IMSI) that is stored both in the SIM and in the AuC. In operation, the client application of smartphone 110 communicates with ePDG 130 over the SWu interface (IKEv2/IPsec) and ePDG 130 communicates with AAA server 310 over the SWm DIAMETER interface. AAA server 310 retrieves AKA authentication vectors for use in the procedure from AuC 211 over the SWx DIAMETER interface. The s2b interface connects ePDG 130 to PGW 140 for the purpose of providing access to EPC 150 for successfully authenticated sessions where the user device is allowed EPC access.

Support for the conventional EAP-AKA authentication algorithm relies on several points: In particular, the SIM and AuC each hold a copy of the Secret Key, Ki, for the user device/subscription and that Secret Key is never divulged outside of these two trusted environments. Additionally, during an EAP-AKA procedure, the ePDG hands off the processing of the authentication method to a backend authentication server, typically an AAA server. The AAA server in turn requests a set of authentication vectors from the AuC. The authentication vectors are specific to the {IMSI|Ki} combination and are used at the AAA server to make a challenge to the user device, at the user device to check the authenticity of the network, and at the user device to respond to the challenge from the network. The algorithms to support the authentication are performed independently at both ends of the EAP dialog as both ends hold Ki in addition to knowing the identity, IMSI, of the user device/subscription. The output of the execution of the conventional authentication algorithm includes a MSK, from which is derived a set of session keys that are used to establish the IKEv2 IPsec SA between the user device and the ePDG. This IPsec SA is then used to initiate an IPsec ESP SA for actual data transfer between the user device and ePDG. The MSK is independently derived at both ends of the authentication session (e.g., user device and AAA server) such that it is never communicated between the peers in the authentication.

Access to the SIM, however, is prohibited for non-authorized use and thus it is generally not possible for third party applications to execute SIM-based algorithms to enable authentication of the device to the network. That is, given that Ki is securely stored in the SIM and that third party applications are forbidden access both to the Ki value and to the authentication algorithm that might otherwise make use of it, then third party applications are not able to use a SIM-based authentication method using Ki. Typically, if the application at the user device is not capable of executing SIM-based authentication then multiple sets of credentials and protocols are required to first authenticate the application to the ePDG, and subsequently to authenticate the application to the IMS. For example, the mobile operator may select the extensible authentication protocol-transport layer security (EAP-TLS) protocol for authentication of the application to the ePDG and the SIP Digest protocol for authentication of the application to the IMS.

These alternate EAP methods not only necessitate that multiple authentication methods must be simultaneously deployed, but also require that a number of incremental features be supported in the network. For example, EAP-TLS utilizes a Certificate Management System for client certificate generation, maintenance and revocation. Further, EAP-TLS protocol support is required at the client, ePDG, and backend EAP authentication server (e.g., AAA Server). Certificate distribution and update from the network to the client must also be provided for with respect to EAP-TLS. Similarly, SIP Digest utilizes additional SIP Digest credentials managed in the network and stored in the HSS and at the client as well as SIP Digest support at the P-CSCF/S-CSCF (proxy-call session control function/serving-call session control function) nodes in the IMS network. Each of these features represents additional overhead (and therefore cost) for the mobile operator, purely to support those client types that are not capable of SIM-based authentication.

Embodiments of the invention provide for use of a single authentication method for each point in the network where authentication is required (e.g., at the ePDG and at the entry to the IMS domain). That is, embodiments of a third party application authentication process herein fit into a standard mutual authentication architecture (e.g., ePDG and AAA server architecture) to use the same network elements and provide an authentication result that appears to one or more such network elements as having been performed by a standard authentication process (e.g., SIM-based EAP-AKA). However, in light of the secure nature of the Secret Key, Ki, mobile operators will not or cannot allow Ki to be taken outside of the secure environment and stored elsewhere for the purposes of enabling third party applications to authenticate with the network because to do so would potentially compromise the subscriber's entire account over both trusted and untrusted access networks if Ki became known publicly. Accordingly, embodiments of the present invention provide an authentication procedure, such as an EAP-AKA procedure, to be used within the standard network security architecture to authenticate third party applications that are forbidden access to a particular secret key, such as to establish an IPsec SA for third party applications. Using authentication procedures in accordance with the concepts herein, mobile operators, for example, may gain substantially the same level of benefits of a SIM-based EAP-AKA authentication process by enabling third party applications to utilize the same security methods, protocols, and architecture that is shared with devices performing native, SIM-based authentication concurrently. Benefits of extending the same mobile network security architecture to all clients in accordance with embodiments herein, include enabling the mobile operator to choose from a wider selection of network-based security platforms as the list of feature requirements narrows, as well as minimizing the number of different protocols and authentication methods used in the network, thereby reducing operational costs and network capital expenditure. Moreover, the authentication procedures maintain the privacy and security of the Secret Key, Ki, associated with the user device subscription in the HSS/AuC.

It should be appreciated that in the performance of an EAP-AKA procedure, the ePDG platform has no direct stake in the details of the authentication method between the user device and the AAA server. Accordingly, as long as the AAA server reports a successful authentication to the ePDG and provides a MSK value that is the same value as the MSK derived at the user device, then the ePDG conditions are satisfied and the IKEv2 procedure can complete, whereby the IPsec SA may then be established. Therefore, a third party application authentication procedure in accordance with the concepts herein may implement differences as compared to an EAP-AKA procedure and nevertheless facilitate satisfactory completion of the authentication and assure the ePDG that the user device has been successfully authenticated and to setup access to the EPC for the subscriber.

For example, embodiments of an authentication procedure to be used within the standard network security architecture to authenticate third party applications in accordance with concepts herein operate so as to never require the Secret Key, Ki, for the IMSI to be divulged outside of the AuC and the SIM. Nevertheless, the third party application authentication procedure of embodiments independently derive the same value for MSK at each peer in the authentication process (e.g., user device and AAA server). Further, third party application authentication procedures of embodiments operate to generate a proper challenge to the user device at the AAA server, properly authenticate the network to the user device, and respond correctly at the user device to the AAA server challenge. In providing operation so as to never require the Secret Key, Ki, to be divulged, a third party application authentication procedure of embodiments utilize an alternate Secret Key (referred to herein as SK') within the authentication process for support of EAP-AKA with respect to a third party application.

Embodiments of the invention operate to generate and store an alternate Secret Key, SK', in such a way that it is both accessible to the user device and used in the operator's network to generate a set of authentication vectors that are unique to the user device and alternate Secret Key combination (e.g., {IMSI SK'}). Accordingly, the alternate Secret Key, SK', is known by the third party application and by the platform providing the authentication vectors to the AAA server in the network according to embodiments herein. Further, in accordance with embodiments of a third party application authentication procedure, the backend authentication platform is adapted to know or detect that the user device is using an alternate Secret Key, SK', (not Secret Key, Ki) and to perform the appropriate procedure for the key type by retrieving and using an authentication vector associated with SK' (not an authentication vector associated with Ki), as input to the authentication algorithm.

In operation according to embodiments, the identity reported by the user device for the authentication (e.g., the identification reported in the IDi payload in the first IKEv2 IKE-AUTH) is the proper identification for the user device (e.g., the IMSI for the SIM in the user device). Such operation may be preferable because an AAA server may check the user profile for the user device to determine their authority to access the EPC from an untrusted access network and, subsequently, the ePDG may use the user device's proper identification (e.g., real IMSI) when setting up the GPRS tunneling protocol (GTP) to the PGW.

Third party applications (e.g., downloadable applications) often perform some form of activation and configuration procedure, such as when they initially execute. Such activation and configuration processing serves to authenticate the identity of the user through some means (e.g., by sending a onetime password via SMS or by use of HTTP Header Enrichment in a mobile operator's data network) and to provision (e.g., by download) configuration data into the application such that it is transformed from its generic version (e.g., "app store" version) into a configuration tailored for a particular network and subscriber. Activation and configuration processing with respect to various third party applications may be adapted to facilitate an authentication procedure to be used within the standard network security architecture to authenticate third party applications in accordance with embodiments of the invention. Exemplary third party applications include Voice Calling over Wi-Fi (Wi-Fi calling) applications, Video Calling over Wi-Fi applications, and applications supporting Rich Communications Services (RCS).

Figure 4:
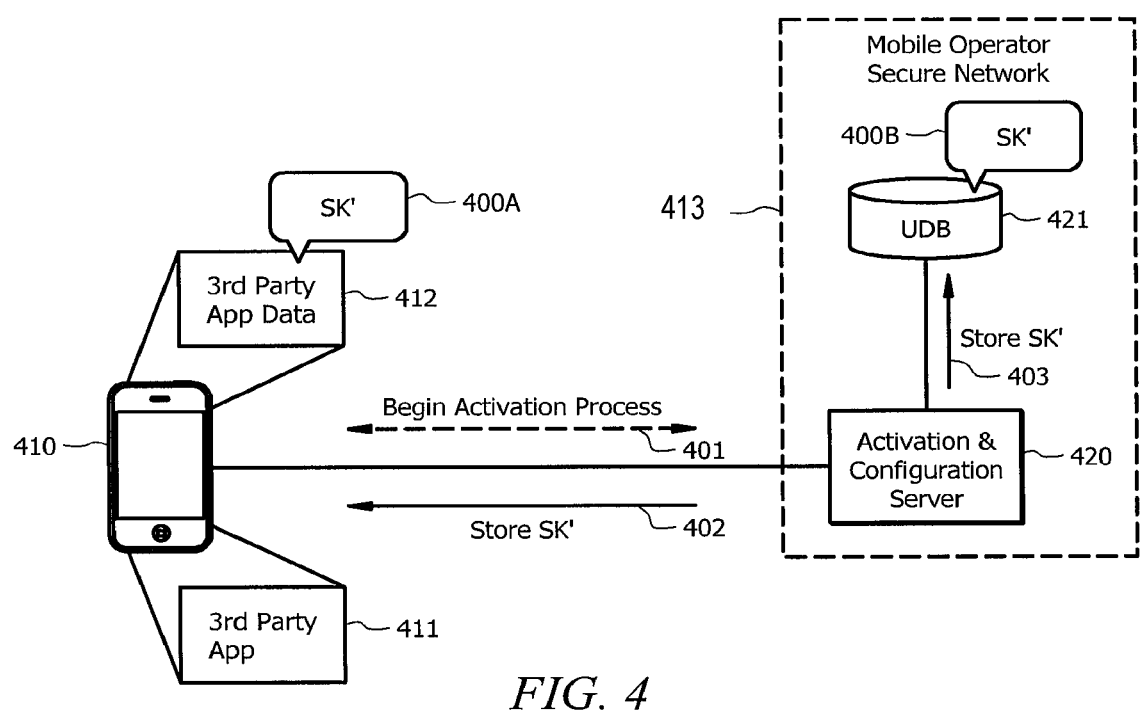
FIG. 4 shows generation and storage of an alternative secret key utilized in third party application authentication according to embodiments of the present invention.

FIG. 4 shows third party application activation and configuration processing according to embodiments of the invention. In the embodiment illustrated in FIG. 4, a user device such as smartphone 413 is in communication with activation and configuration server (ACS) 420 of mobile operator secure network 410. ACS 420 comprises one or more servers deployed in the mobile operator's secure network for activation and configuration processing with respect to various third party applications as may be operable upon various user device configurations. Although the user device illustrated in FIG. 4 is shown as smartphone 410, it should be appreciated that any number of processor-based device configurations (e.g., personal computers (PCs), portable computers, personal digital assistants (PDAs), tablet devices, streaming media players, set-top boxes (STBs), etc.) may be utilized with embodiments herein. Accordingly, it should be appreciated that the concepts of the present invention may be utilized in providing authentication of any such configuration of processor-based system. Moreover, the third party application authentication methods of embodiments can be extended in a multi-device scenario for non-SIM based devices (e.g., the multi-device may be given a unique (soft) IMSI identity during configuration, in addition to SK'). Further, although examples are provided herein with reference to a cellular or mobile network, an authentication process provided according to embodiments may be used within the standard security architecture of various network configurations to authenticate third party applications as described herein.

In operation according to the embodiment illustrated in FIG. 4, third party application 411 is executed on smartphone 410 whereby an activation procedure with ACS 420 in mobile operator secure network 410 is initiated (activation exchange 401) over a secured connection (e.g., as may have been established using a SIM-based authentication protocol). Once the subscriber has been authenticated by the network, ACS 420 of embodiments sends configuration data (e.g., data of third party application data 412) to third party application 411 (configuration exchange 402) and stores configuration data in associated network-located user database (UDB) 421 (configuration exchange 403). In addition to providing configuration data tailoring third party application 411 to the mobile operator's network and/or the user of smartphone 410 preferences, the configuration data exchanges provided according to embodiments includes an alternate secret key, SK', value for use in providing third party application authentication according to the concepts herein. For example, during the activation and configuration processing, ACS 420 may generate a value for SK' and include this in the configuration data for third party application 411. SK' 400A is therefore sent to smartphone 410 of the illustrated embodiment where it is stored securely in third party application data 412, and corresponding SK' 400B is sent to UDB 421 where it is stored in the network (it being appreciated that SK' 400A and SK' 400B represent multiple instances of the same secret key value). Accordingly, the illustrated embodiment operates to generate and store an alternate Secret Key, SK', that it is known by the third party application and is available for use by a platform providing the authentication vectors for authenticating the third party application.

It should be appreciated that generation and distribution of alternate Secret Keys as a function of the third party application activation procedure, as described above, facilitates the sharing of such alternate keys as part of an otherwise normal setup procedure. Accordingly, embodiments of the invention, although using alternative credentials for authentication of third party applications, does not introduce significant overhead or cost into the deployment or management of those alternative credentials.

For the EAP-AKA method, the identity of the subscriber device (e.g., smartphone 410) is passed to the network (e.g., mobile operator secure network 413) from the client being authenticated (e.g., third party application 411) in the 1st IKE-AUTH message. The identity is generally in the form of a Network Access Identifier (NAI, RFC 4282) composed of a username and realm in the form username@realm. In the EAP-AKA method, the username is the IMSI, prepended with a standardized value of '0' such that the network can use this prepend to identify that the client is requesting an EAP-AKA authentication method, and the realm is the domain name for the network that will perform the authentication service. An example subscriber device identity in accordance with the foregoing is: "0"&"IMSI"@epc.operator123.com The IMSI may be checked at the AAA server in the network, and may be utilized for the ePDG to setup the tunnel to the PGW to allow the client access to the EPC. Embodiments of an authentication procedure to be used within the standard network security architecture to authenticate third party applications use the actual device IMSI for the username. For devices that do not have embedded SIMs, the operator or other entity may choose to allocate an IMSI for that subscriber from a pool used for that purpose. For devices that do have SIMs, the IMSI may be read from the SIM and authenticated during the activation process, or may be provided by the network during the third party application activation procedure where the network supports the enrichment of HTTP headers with the MSISDN and IMSI of the subscriber who is pre-authenticated in the mobile data network.

In operation according to embodiments of an authentication process to be used within the standard network security architecture to authenticate third party applications in accordance with concepts herein, the third party application signals to the network that it is requesting EAP-AKA service, and the network detects both this signal and that the authentication vectors are to come from a source other than the SIM-based EAP-AKA process (e.g., the authentication vectors are obtained from the UDB, not from the HSS). The detection of the EAP-AKA request signal and/or the detection that the authentication vectors are to come from a source other than the SI-based EAP-AKA process may be performed in one or more places in the network. For example, this detection or some portion thereof may occur at the ePDG, the AAA server, or within the network where the DIAMETER messages between the AAA server and HSS are being routed (e.g., a DIAMETER ROUTING AGENT (DRA)) according to embodiments of the invention.

Elements or steps with the same reference numbers used in different figures are the same or similar and those elements or steps will not be described in detail again.

Figure 5:
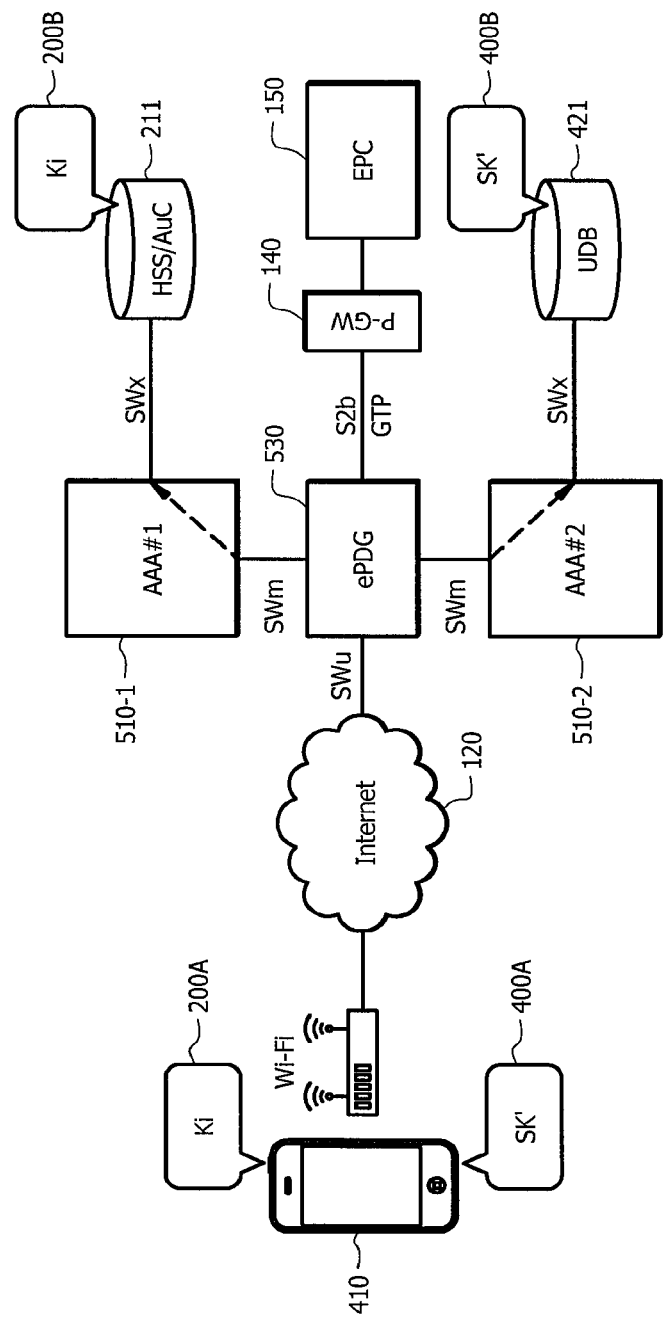
FIG. 5 shows details with respect to backend infrastructure utilized in third party application authentication according to embodiments of the present invention.

FIG. 5 shows an embodiment where ePDG 530 is adapted to make an AAA server selection, and correspondingly selection of where the authentication vectors are to come from, based on whether the request is from a native application using Ki or from a third party application using SK'. In particular, when ePDG 530 detects that Ki 200A is being used with respect to the EAP-AKA process, AAA server 510-1 (having access to Ki 200B stored by AuC 211) is utilized to act as the backend EAP authentication server for the native application EAP-AKA process. However, when ePDG 530 detects that SK' 400A is being used with respect to the EAP-AKA process, AAA server 510-2 (having access to SK' 400B stored by UDB 421) is utilized to act as the backend EAP authentication server for the third party application EAP-AKA process.

Figure 6:
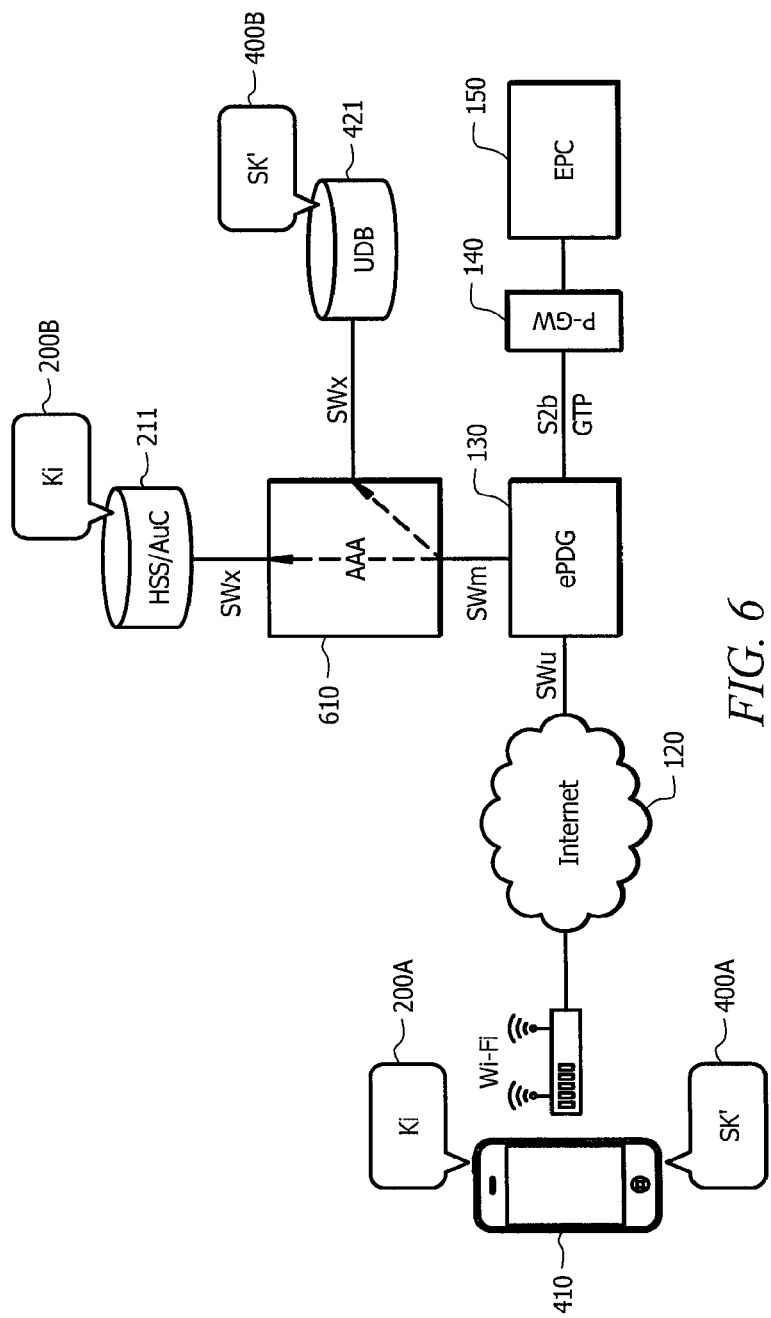
FIG. 6 shows details with respect to backend infrastructure utilized in third party application authentication according to embodiments of the present invention.

FIG. 6 shows an embodiment where AAA server 610 is adapted to make a selection regarding where the authentication vectors are to come from. In particular, when AAA server 610 detects that Ki 200A is being used with respect to the EAP-AKA process, AuC 211 (storing Ki 200B) is utilized for the native application EAP-AKA process. However, when AAA server 610 detects that SK' 400A is being used with respect to the EAP-AKA process, UDB 421 (storing SK' 400B) is utilized for the third party application EAP-AKA process.

Figure 7:
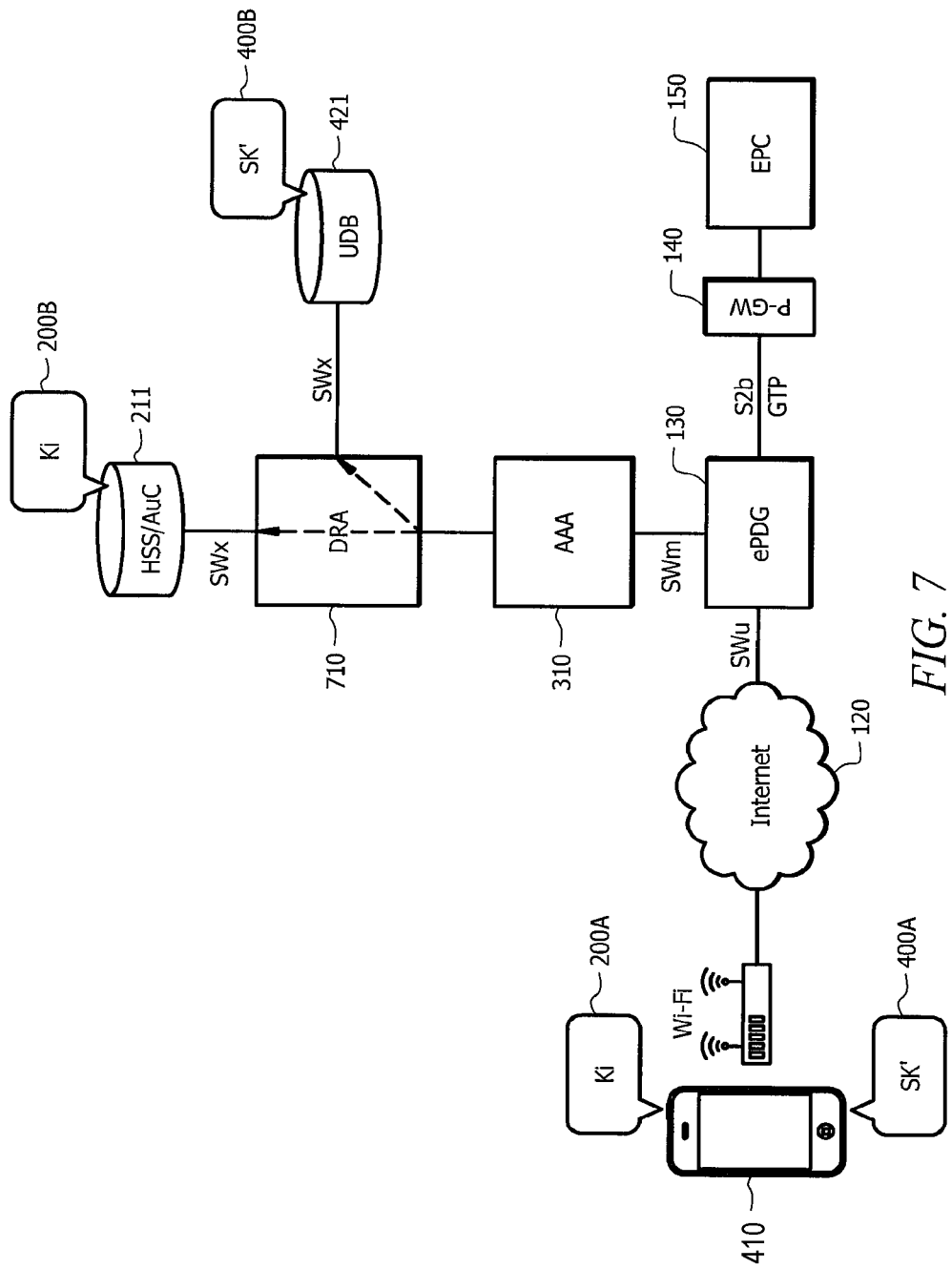
FIG. 7 shows details with respect to backend infrastructure utilized in third party application authentication according to embodiments of the present invention.

FIG. 7 shows an embodiment where DRA 710 is adapted to make a selection regarding where the authentication vectors are to come from. In particular, when DRA 710 detects that Ki 200A is being used with respect to the EAP-AKA process, AuC 211 (storing Ki 200B) is utilized for the native application EAP-AKA process. However, when DRA 710 detects that SK' 400A is being used with respect to the EAP-AKA process, UDB 421 (storing SK' 400B) is utilized for the third party application EAP-AKA process. In some embodiments, DRA 710 is implemented as a server. In some embodiments, DRA 710 is implemented as a component of a network communications device.

The detection by any of ePDG 530, AAA server 610, and DRA 710 of whether Ki or SK', or correspondingly whether a native application or a third party application is being authenticated, may be based upon a variant of the username or realm portions of the NAI. For example, a native application may use the device IMSI prepended with a standardized value of '0' as the user name and the domain name for the network that will perform the authentication service as the realm is when sending the identity of the user to the ePDG in the initial IKE-AUTH message. However, a third party application adapted for an authentication process to be used within the standard network security architecture to authenticate third party applications in accordance with concepts herein may use a variant of the username and/or realm portions of the NAI when sending the identity of the user to the ePDG in the initial IKE-AUTH message.

In providing for the use of a different realm value for the NAI by the third party application, it should be appreciated that 3GPP TS 33.402 accommodates the ePDG making an AAA server selection by the value of the realm according to embodiments herein. In particular, the user device may send an EAP Response/Identity message identifying the user device in compliance with Network Access Identifier (NAI) format specified in TS 23.003. The NAI may contain either a pseudonym allocated to the user device in a previous run of the authentication procedure or, in the case of first authentication, the IMSI. In the case of first authentication, the NAI shall indicate EAP-AKA' as specified in TS 23.003 and the message is routed towards the proper 3GPP AAA server based on the realm part of the NAI. Accordingly, in operation according to embodiments herein, the AAA server may be selected at the ePDG (or AAA Server or even DRA) by selecting the authentication platform address based upon the value in the realm portion of the NAI. For example, the native application and third party application may use different values for the realm, such as the native application using Ki may use IMSI@epc.operator123.com whereas the third party application using SK' may use IMSI@epc.operator456.com.

In providing for the use of username decoration for the third party application, it should be appreciated that RFC 4187 section 4.1.1.4 accommodates username decoration used to perform AAA selection according to embodiments herein. In particular, the peer may decorate the identity by prepending or appending the username with a string, in order to indicate supplementary AAA routing information in addition to the NAI realm (the usage of an NAI realm portion is not considered to be decoration). Accordingly, in operation according to embodiments prepending an explicit string to the username portion of the NAI denotes the use of either conventional EAP-AKA using Ki (e.g., where the string is "0") or EAP-AKA using SK' (e.g., where the string is other than "0") from a different authentication back-end. Similarly, appending some information to the username may provide a similar result. For example, the native application and third party application may use different prepended values, such as the native application using KI may use "0"&IMSI@epc.operator123.com whereas the third party application using SK' may use "99"&IMSI@epc.operator123.com.

Irrespective of the particular technique utilized for determining the source of the authentication vectors, the request for authentication vectors for the third party application using SK' is routed to the UDB, rather than the AuC, according to embodiments of the invention. The UDB of embodiments is adapted to implement the standard HSS/AuC interface (SWx), such as to enable the AAA server to retrieve the authentication vectors as if it were acting as the HSS/AuC. However, alternative protocols may be supported to retrieve those same authentication vectors from the UDB if supported at the particular AAA server of an embodiment.

In operation of an authentication process using an alternate Secret Key, SK', according to embodiments, when the UDB receives the request for an authentication vector it computes the vector based on the user device identity (e.g., IMSI) and SK' values. The authentication vector may, for example, contain a random part RAND, an authenticator part AUTN (e.g., used for authenticating the network to the client), an expected result part XRES, a session key for integrity check IK (e.g., a 128-bit session key), and a session key for encryption CK (e.g., 128-bit session key). The vector is returned to the AAA server for authentication of the client and for generating a MSK value according to embodiments.

Figure 8:
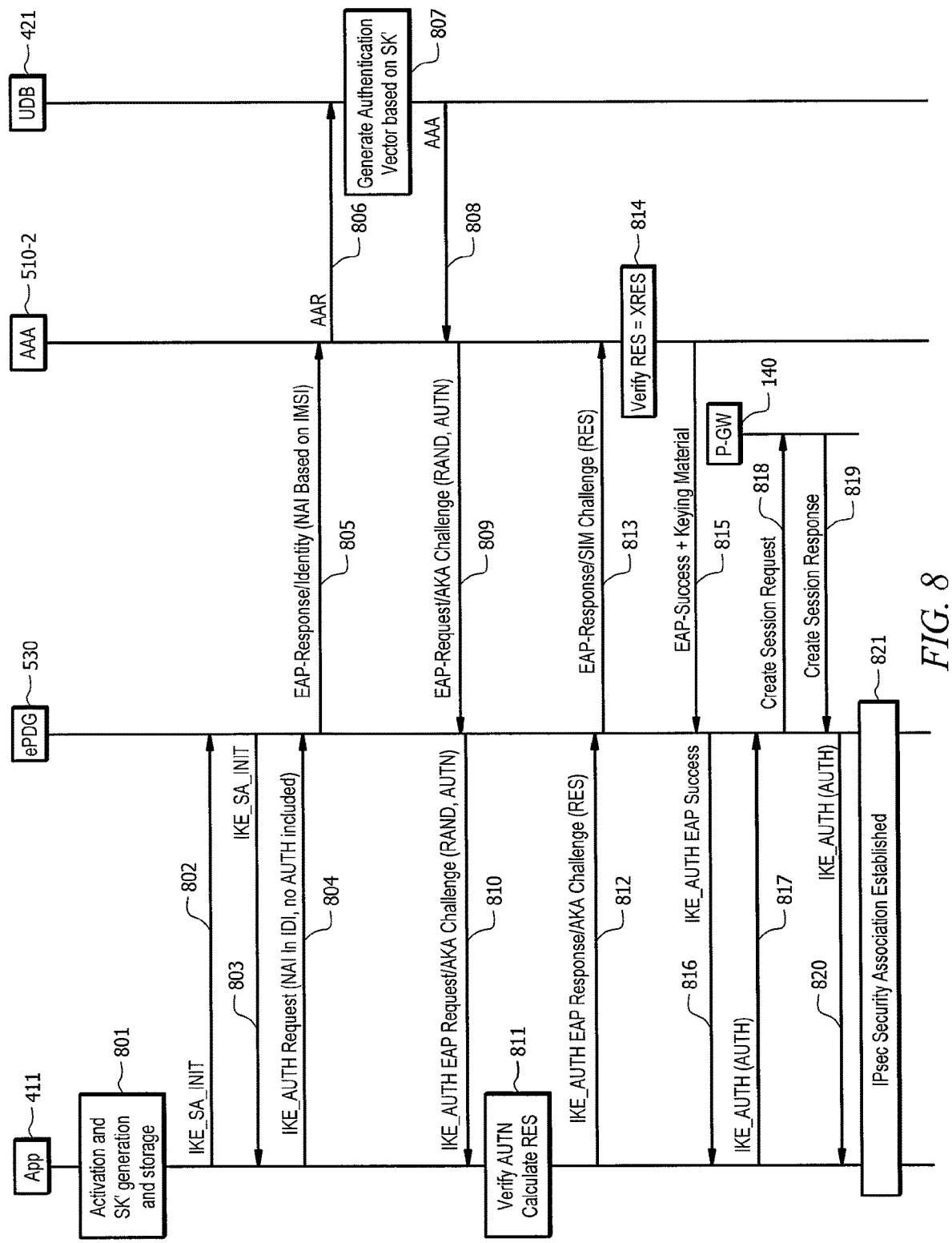
FIG. 8 shows a flow diagram of third party application authentication according to embodiments of the present invention.

FIG. 8 shows a flow of operation providing mutual authentication with respect to a third party application according to embodiments of the invention. For explanatory purposes simplified request and response messages are depicted with the messages and information contained therein illustrated which are most pertinent to explaining the present embodiment of the invention. As it will be appreciated additional information and formatting of the messages as well as the use of additional messages may be and typically is used in initiating and communicating among the user device and as well as between the various network entities described. At block 801 of the exemplary call flow third party application 411 is activated at smartphone 410 and a new Secret Key, SK' is generated for the subscriber (e.g., as described above with respect to FIG. 4). SK' is preferably associated with the user device's proper identity (e.g., IMSI). The SK' may be sent to third party application 411 in configuration data, and may be stored in the user record in UDB 421.

Thereafter, in performing authentication of the third party application, third party application 411 and ePDG 530 may exchange the first pair of messages (shown as exchanges 802 and 803), known as IKE_SA_INIT, in which the ePDG and user device negotiate cryptographic algorithms, exchange nonces and perform a Diffie-Hellman exchange which is a method of securely exchanging cryptographic keys over a public channel. Having negotiated the cryptographic session, third party application 411 may send the user device identity (e.g., in the IDi payload) and the APN information (e.g., in the IDr payload) in the first message of the IKE_AUTH phase (shown as exchange 804), and may begin negotiation of child security associations. In operation according to the illustrated embodiment, third party application 411 omits the AUTH parameter in the IKE_AUTH message in order to indicate to ePDG 530 that third party application 411 wants to use EAP over IKEv2. Preferably, the user device identity is compliant with Network Access Identifier (NAI) format specified in TS 23.003 containing the IMSI or the pseudonym, as defined for EAP-AKA in RFC 4187. Third party application 411 of embodiments further sends the configuration payload (CFG_REQUEST) within the IKE_AUTH request message to obtain an IPv4 and/or IPV6 home IP Address and/or a Home Agent Address.

ePDG 530 of the embodiment illustrated in FIG. 8 sends the Authentication and Authorization Request message to AAA server 510-2 (shown as exchange 805), preferably containing the user identity and APN. Thereafter, AAA server 510-2 of the illustrated embodiment requests an authentication vector from UDB 421 (shown as exchange 806).

In operation according to embodiments, at block 807 UDB 421 generates an authentication vector containing a random number (RAND) an authentication token (AUTN) computed using an appropriate algorithm, the correct response to the challenge (XRES), and session keying material, (CK, IK). It should be appreciated that it is not necessary to use the AKA algorithm when computing the authentication token, according to embodiments. Accordingly, a less computationally expensive method for computing an authentication token may be utilized if available and otherwise appropriate. RAND/AUTN are sent to third party application 411 in the EAP-Challenge, and CK, IK, and XRES may be stored at AAA server 510-2 for later use in the authentication process. Accordingly, UDB 421 of the illustrated embodiment sends the authentication vector to AAA server 510-2 (shown as exchange 808).

AAA server 510-2 of the illustrated embodiment initiates the authentication challenge to third party application 411 via ePDG 530 (shown as exchange 809). Thereafter, ePDG 530 responds to third party application 411 (exchange 810) with its identity, a certificate, and sends the AUTH parameter to protect the previous message it sent to the user device (in the IKE_SA_INIT exchange). The EAP message received from AAA server 510-2 (EAP-Request/AKA-Challenge) is preferably included in order to start the EAP procedure over IKEv2.

At block 811 of the illustrated embodiment, third party application 411 checks the authentication parameters and computes the response to the challenge, RES. Thereafter, third party application 411 responds to the authentication challenge (shown as exchange 812). The only payload, apart from the header, in the IKEv2 authentication challenge response message of embodiments may be the EAP message. ePDG 530 of the illustrated embodiment in turn forwards the EAP-Response/AKA-Challenge message to AAA server 510-2 (shown as exchange 813) and AAA 510-2 checks if the authentication response is correct (RES=XRES) at block 814.

When all checks are successful, AAA server 510-2 of the illustrated embodiment sends the final Authentication and Authorization Answer with a result code indicating success (shown as exchange 815) and including the relevant service authorization information, an EAP success, and the key material to ePDG 530. The key material of embodiments comprises the MSK generated during the authentication process. When the SWm and SWd interfaces between ePDG 530 and AAA server 510-2 are implemented using Diameter, the MSK may be encapsulated in the EAP-Master-Session-Key-AVP, as defined in RFC 4072, for example.

The MSK may be used by ePDG 530 of embodiments to generate the AUTH parameters in order to authenticate the IKE_SA_INIT phase messages, as specified for IKEv2 in RFC 5996. For example, these two first messages (e.g., exchanges 801 and 802) had not been authenticated before as there was no key material available yet. According to RFC 5996, the shared secret generated in an EAP exchange (e.g., the MSK), when used over IKEv2, is used to generated the AUTH parameters. The EAP Success/Failure message is forwarded to the user device over IKEv2 (shown as exchange 816) according to embodiments. Third party application 411 may take its own copy of the MSK as input to generate the AUTH parameter to authenticate the first IKE_SA_INIT message. The AUTH parameter is sent to ePDG 530 (shown as exchange 817) according to embodiments.

ePDG 530 of embodiments checks the correctness of the AUTH received from the user device and, assuming the AUTH received from the user device is correct third party application 411 is authenticated. ePDG 530 may thereafter setup the GPRS tunneling protocol (GTP) bearer to PGW over the s2b interface (shown as exchanges 818 and 819).

In operation according to the illustrated embodiment, ePDG 530 calculates the AUTH parameter which authenticates the second IKE_SA_INIT message and thereafter sends the assigned Remote IP address in the configuration payload (CFG_REPLY) as the AUTH parameter, together with the security associations and the rest of the IKEv2 parameters, to the user device (shown as exchange 820). According to the illustrated embodiment, thereafter the IKEv2 negotiation terminates and the IPsec SA is established at block 821.

It can be appreciated from the foregoing that the authentication according to the illustrated embodiment takes place between the third party application and the AAA server as normal in an EAP-AKA exchange. In the exemplary flow, the authentication vector is provided from the UDB (e.g., using a standard interface) such that the AAA server and ePDG are using the normal EAP-AKA process. However, the third party application has been authenticated by the use of an alternate Secret Key, SK' (e.g., as may have been generated at the time of the application activation), rather than by the use of the SIM-based key, Ki. In some embodiments, in place of the AKA algorithm, other algorithms are employed to perform authentication and derive CK and IK at the third party application and the UDB independently. A requirement of these other algorithms is that when executed their results provide the correct length values for CK and IK derived at each peer in the process.

As described above, embodiments of an authentication process operable to authenticate third party applications performs with respect to infrastructure within the network (e.g., the ePDG, the AAA server, etc.) in accordance with the standard network EAP-AKA security architecture. It should be appreciated that embodiments as described herein are further operable to support EAP-AKA Fast Re-authentication and EAP-AKA' (RFC 5448).

In a conventional SIM-based authentication, the authentication method may be used over trusted Cellular networks, in the CS (circuit switching) as well as the PS (packet switching) domain and over untrusted access networks. Accordingly, the SIM and AuC must synchronize the Sequence number that is used as input to the authentication algorithm to make sure that both ends are using the same inputs and deriving the same results. In operation of embodiments of an authentication process herein, there is no requirement to synchronize Sequence numbers with the AuC for third party applications authenticated using an EAP-AKA type authentication process. For example, the authentication credentials and algorithm of embodiments are separate and distinct from the native SIM-based AKA algorithm and therefore no synchronization is necessary.

Embodiments have been described above with reference to the use of an AAA server in the backend authentication infrastructure utilized with respect to an authentication process operable within the standard network security architecture to authenticate third party applications according to the concepts herein. The ability to utilize such an AAA server is advantageous according to embodiments of the invention due to the relatively widespread deployment of such infrastructure in various operators' networks (e.g., mobile operators' networks), such as for use in authenticating native applications using SIM-based EAP-AKA processes. That is, an authentication process for third party applications of embodiments herein may readily be deployed to leverage the use of such AAA servers with little cost or disruption to the operators (e.g., software modifications of a ePDG to select an appropriate AAA server for third party application authentication, software modifications at the AAA server to obtain third party application authentication vectors from a UDB, or software modification of a DRA 710 to obtain third party application authentication vectors from a UDB, as described above).

However, the AAA server itself is often a complicated and expensive platform in the network. For example, an AAA server is typically adapted to perform functions in addition to an authentication process as described herein. An AAA server may not always be present or its use desired in all situations. For example, embodiments of a third party authentication process in accordance with the concepts herein may be deployed in one or more networks where the use of an AAA server is not available (e.g., an AAA server is not already present for native application authentication, third party application authentication using the AAA server would overwhelm the AAA server resources or require upgrade, such as in a situation where the third party application authentications significantly outnumber the native application authentications). Accordingly, embodiments of the present invention utilize an alternative backend authentication infrastructure to a traditional AAA server. Such alternative backend infrastructure of embodiments provides a lower cost, simpler authentication path than an AAA server. Alternative backend infrastructure provided in accordance with embodiments may, for example, provide simpler, less expensive infrastructure, such as by being adapted only to perform authentication processing in accordance with the concepts herein.

Figure 9:
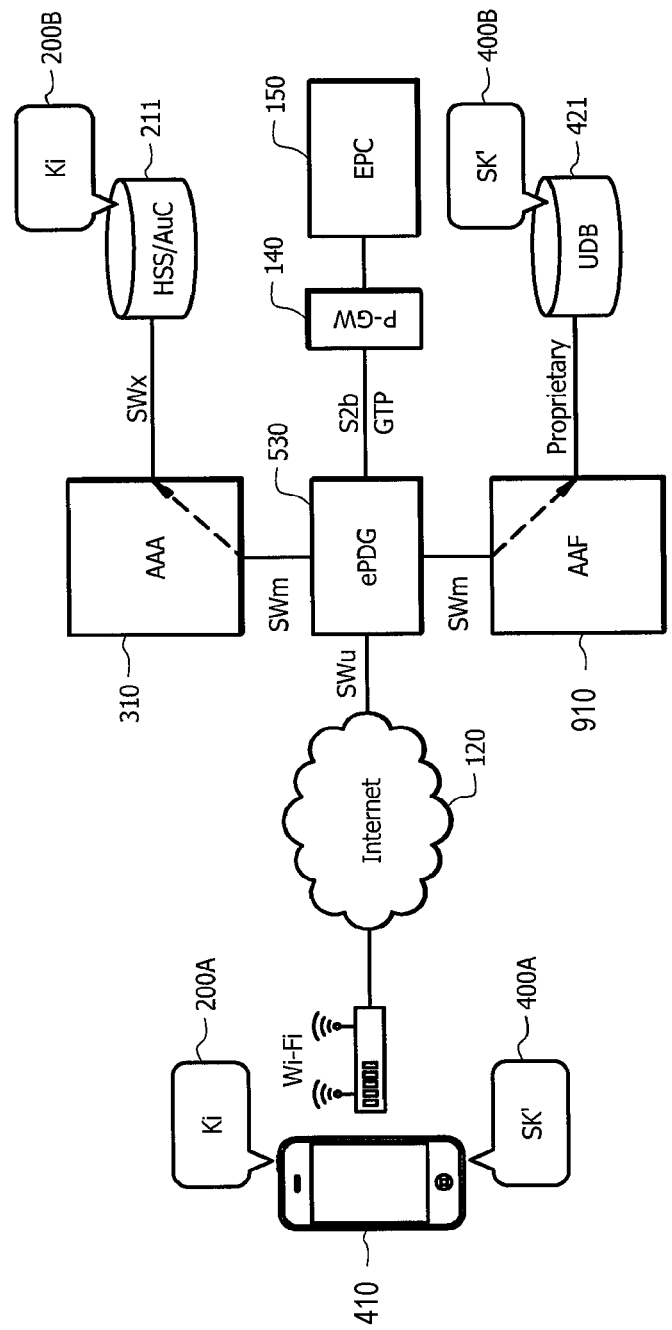
FIG. 9 shows detail with respect to backend infrastructure utilized in third party application authentication according to embodiments of the present invention.

FIG. 9 shows an embodiment wherein alternative backend infrastructure to an AAA server is provided in the form of AKA Assist Function (AAF) 910. AAF 910 of embodiments comprises a server based platform providing authentication process functions as described herein. In the embodiment of FIG. 9, similar to that of FIG. 5 described above, ePDG 530 is adapted to make a selection with respect to AAA server 310 and AAF 910, and correspondingly selection of where the authentication vectors are to come from, based on whether the request is from a native application using Ki or from a third party application using SK'. In particular, when ePDG 530 detects that Ki 200A is being used with respect to the EAP-AKA process, AAA server 310 (having access to Ki 200B stored by AuC 211) is utilized to act as the backend EAP authentication server for the native application EAP-AKA process. However, when ePDG 530 detects that SK' 400A is being used with respect to the EAP-AKA process, AAF 910 (having access to SK' 400B stored by UDB 421) is utilized to act as the backend EAP authentication server for the third party application EAP-AKA process.

In operation according to embodiments, AAF 910 presents a standard DIAMETER or RADIUS interface to ePDG 530 and expects a limited set of DIAMETER or RADIUS messages (e.g., those used for EAP-AKA authentication) to be supported over that interface. AAF 910 of embodiments may have a proprietary interface to UDB 421 by which it can retrieve SK' for any user record. Accordingly, a difference over the traditional AAA server architecture may be implemented with respect to AAF 910 wherein UDB 421 provides SK' to AAF 910 and AAF 910 generates the authentication vector. This configuration enables the interface from AAF 910 to UDB 421 to be any proprietary protocol as it is specific to the AAF/UDB communication. Nevertheless, AAF 910 of embodiments may appear to ePDG 530 as a standard AAA server in the system.

Although the exemplary embodiment illustrated in FIG. 9 shows both an AAF and an AAA server, it should be appreciated that one or more AAFs may be utilized with or without an AAA server deployed in the network. For example, where third party application authentication is to be provided without native application authentication, or other SIM-based EAP-AKA authentication, one or more AAF may be utilized without an AAA server, AuC, etc.

Figure 10:
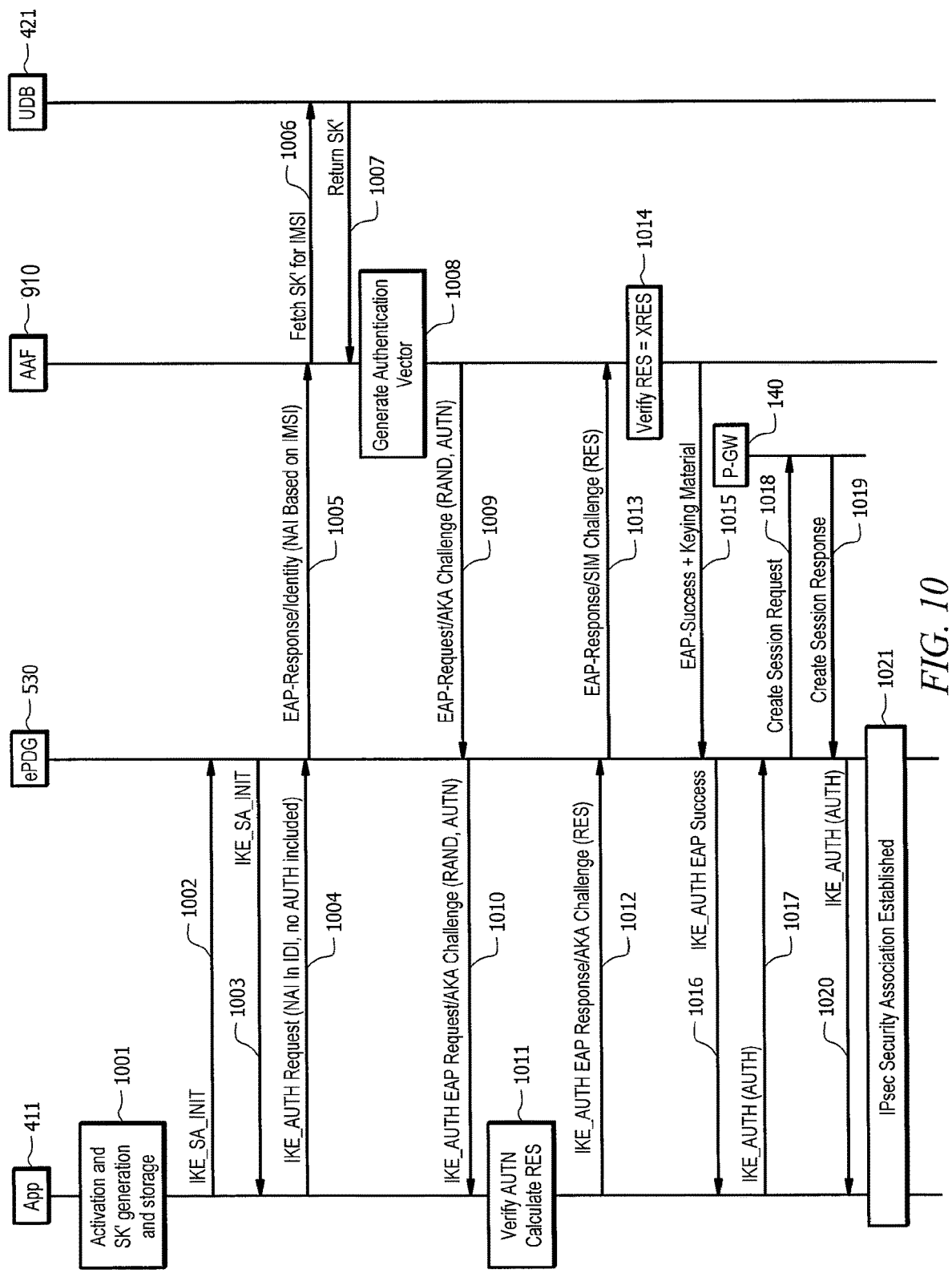
FIG. 10 shows a flow diagram of third party application authentication according to embodiments of the present invention.

FIG. 10 shows a flow of operation to provide mutual authentication with respect to a third party application utilizing an AAF according to embodiments of the invention. For explanatory purposes simplified request and response messages are depicted with the messages and information contained therein illustrated which are most pertinent to explaining the present embodiment of the invention. As it will be appreciated additional information and formatting of the messages as well as the use of additional messages may be and typically is used in initiating and communicating among the user device and as well as between the various network entities described. At block 1001 of the exemplary call flow third party application 411 is activated at smartphone 410 and a new Secret Key, SK' is generated for the subscriber (e.g., as described above with respect to FIG. 4). SK' is preferably associated with the user device's proper identity (e.g., IMSI). The SK' may be sent to third party application 411 in configuration data, and may be stored in the user record in UDB 421.

Thereafter, in performing authentication of the third party application, third party application 411 and ePDG 530 may exchange IKE_SA_INIT messages (shown as exchanges 1002 and 1003), in which the ePDG and user device negotiate cryptographic algorithms, exchange nonces and perform a Diffie-Hellman exchange. Having negotiated the cryptographic session, third party application 411 may send the user device identity (e.g., in the IDi payload) and the (Access Point Number) information (e.g., in the IDr payload) in the first message of the IKE_AUTH phase (shown as exchange 1004), and may begin negotiation of child security associations. In operation according to the illustrated embodiment, third party application 411 omits the AUTH parameter in the IKE_AUTH message in order to indicate to ePDG 530 that third party application 411 wants to use EAP over IKEv2. Preferably, the user device identity is compliant with Network Access Identifier (NAI) format specified in TS 23.003 containing the IMSI or the pseudonym, as defined for EAP-AKA in RFC 4187. Third party application 411 of embodiments further sends the configuration payload (CFG_REQUEST) within the IKE_AUTH request message to obtain an IPv4 and/or IPV6 home IP Address and/or a Home Agent Address.

ePDG 530 of the embodiment illustrated in FIG. 10 sends the Authentication and Authorization Request message to AAF 910 (shown as exchange 1005), preferably containing the user identity and APN. Thereafter, AAF 910 of the illustrated embodiment operates to lookup the user record for the IMSI in UDB 421 and retrieves the appropriate SK' (exchanges 1006).

The UDB 421 responds to the Fetch SK' for IMSI request by retrieving the appropriate SK' and returning it to AAF 910 (exchange 1007).

At block 1008 of the illustrated embodiment AAF 910 generates an authentication vector containing a random number (RAND) an authentication token (AUTN) computed using an appropriate algorithm, the correct response to the challenge (XRES), and session keying material, (CK, IK). It should be appreciated that it is not necessary to use the AKA algorithm when computing the authentication token, according to embodiments. Accordingly, a less computationally expensive method for computing an authentication token may be utilized if available and otherwise appropriate. RAND/AUTN are sent to third party application 411 in the EAP-Challenge, and CK, IK, and XRES may be stored at AAF 910 for later use in the authentication process.

AAF 910 of the illustrated embodiment initiates the authentication challenge to third party application 411 via ePDG 530 (shown as exchange 1009). Thereafter, ePDG 530 responds to third party application 411 (exchange 1010) with its identity, a certificate, and sends the AUTH parameter to protect the previous message it sent to the user device (in the IKE_SA_INIT exchange). The EAP message received from AAF 910 (EAP-Request/AKA-Challenge) is preferably included in order to start the EAP procedure over IKEv2.

At block 1011 of the illustrated embodiment, third party application 411 checks the authentication parameters and computes the response to the challenge, RES. Thereafter, third party application 411 responds to the authentication challenge (shown as exchange 1012). The only payload, apart from the header, in the IKEv2 authentication challenge response message of embodiments may be the EAP message. ePDG 530 of the illustrated embodiment in turn forwards the EAP-Response/AKA-Challenge message to AAF 910 (shown as exchange 1013) and AAF 910 checks if the authentication response is correct (RES=XRES) at block 1014.

When all checks are successful, AAF 910 of the illustrated embodiment sends the final Authentication and Authorization Answer with a result code indicating success (shown as exchange 1015) and including the relevant service authorization information, an EAP success, and the key material to ePDG 530. The key material of embodiments comprises the MSK generated during the authentication process. When the SWm and SWd interfaces between ePDG 530 and AAF 910 are implemented using Diameter, the MSK may be encapsulated in the EAP-Master-Session-Key-AVP, as defined in RFC 4072, for example.

The MSK may be used by ePDG 530 of embodiments to generate the AUTH parameters in order to authenticate the IKE_SA_INIT phase messages, as specified for IKEv2 in RFC 5996. For example, these two first messages (e.g., exchanges 1002 and 1003) had not been authenticated before as there was no key material available yet. According to RFC 5996, the shared secret generated in an EAP exchange (e.g., the MSK), when used over IKEv2, is used to generated the AUTH parameters. The EAP Success/Failure message is forwarded to the user device over IKEv2 (shown as exchange 1016) according to embodiments. Third party application 411 may take its own copy of the MSK as input to generate the AUTH parameter to authenticate the first IKE_SA_INIT message. The AUTH parameter is sent to ePDG 530 (shown as exchange 1017) according to embodiments.

ePDG 530 of embodiments checks the correctness of the AUTH received from the user device and, assuming the AUTH received from the user device is correct third party application 411 is authenticated. ePDG 530 may thereafter setup the GTP bearer to PGW over the s2b interface (shown as exchanges 1018 and 1019).

In operation according to the illustrated embodiment, ePDG 530 calculates the AUTH parameter which authenticates the second IKE_SA_INIT message and thereafter sends the assigned Remote IP address in the configuration payload (CFG_REPLY) as the AUTH parameter, together with the security associations and the rest of the IKEv2 parameters, to the user device (shown as exchange 1020). According to the illustrated embodiment, thereafter the IKEv2 negotiation terminates and the IPsec SA is established at block 1021.

It can be appreciated from the foregoing that the authentication according to the illustrated embodiment takes place between the third party application and the AAF in a manner that appears to the ePDG as if an AAA server performed the authentication processing in an EAP-AKA exchange. In the exemplary flow, the authentication vector is provided from the UDB (e.g., using either a standard or proprietary interface). Nevertheless, a standard interface is provided between the AAF and ePDG of embodiments such that the ePDG is using the normal EAP-AKA process. However, the third party application has been authenticated by the use of an alternate Secret Key, SK' (e.g., as may have been generated at the time of the application activation), rather than by the use of the SIM-based key, Ki. The algorithm used to perform authentication and derive CK and IK at the third party application and the UDB independently may be, and in some embodiments is, an algorithm different than the AKA algorithm. One requirement of such alternative algorithms is that when employed and executed they result in providing the correct length values for CK and IK derived at each peer in the process. By way of further explanation, to meet the needs of the network security element (e.g., ePDG) which is configured to operate with respect to a particular authentication algorithm (EAP-AKA) being in use between the end-points (e.g., UE and AAA), one of the outputs of an alternate authentication algorithm must be a Master Session Key (MSK) from which the session keys CK and IK can be derived. The session keys CK and IK are sent by the AAA server to the ePDG and derived independently at the UE. The only condition is that these session keys CK, IK are the correct length to fulfill the requirements of usage as a session key for the purposes of securing the IPsec security association resulting from a successful EAP-AKA authentication process.

In some embodiments, an alternative authentication algorithm may be used which initially produces a Master Session Key having a different length than the AKA algorithm MSK but the alternative algorithm then modifies the Master Session Key so that it has the same length as a MSK used in the AKA algorithm such that the alternative algorithm ultimately produces a MSK that can be used to resolve CK and IK appropriately. One simple way to modify an initial MSK having fewer digits than an AKA MSK is to append or prepend a set of zeros to the shorter MSK so that it has same length value as an AKA MSK. A simply way to modify an initial MSK having more digits than an AKA MSK is to remove leading or trailing digits from the initial MSK so that it has the same length as an AKA MSK. The methods discussed to adjust the initial MSK length were chosen for their simplicity in explaining the concept and are only meant to be exemplary. Other methods may be utilized as long as the CK, IK values are the correct format to support their use as session keys in an IPsec Security Association.

Irrespective of the particular backend infrastructure utilized (e.g., AAA server, AAF, etc.), the third party application authentication process according to embodiments operates with respect to network security elements (e.g., ePDG) as if a SIM-based EAP-AKA authentication process has been performed. However, instead of utilizing the SIM-based secret key, Ki, embodiments utilize an alternate Secret Key, SK'. Such operation facilitates the use of the same security element in the network performing native application authentication and third party application authentication with little (e.g., relatively simple software modification for directing authentication requests to appropriate backend infrastructure) or no modification, using different credentials.

It should be appreciated that the alternate Secret Key, SK', utilized according to embodiments of the invention is not SIM-based, and thus may not be subject to the control restrictions associated with SIM-based keys (e.g., Ki). For example, SIM-based key, Ki, is held very tightly in the SIM and in the AuC and the value of Ki never changes. In contrast, the value of SK' may be more flexible, and thus may be changed periodically according to embodiments. For example, SK' for third party applications may be changed periodically, such as when the Activation and Configuration Server in the network periodically contacts the third party application. Additionally or alternatively, SK' for a particular third party application may be changed when SK' for that third party application has been compromised or is otherwise believed to be at risk.

Figure 11:
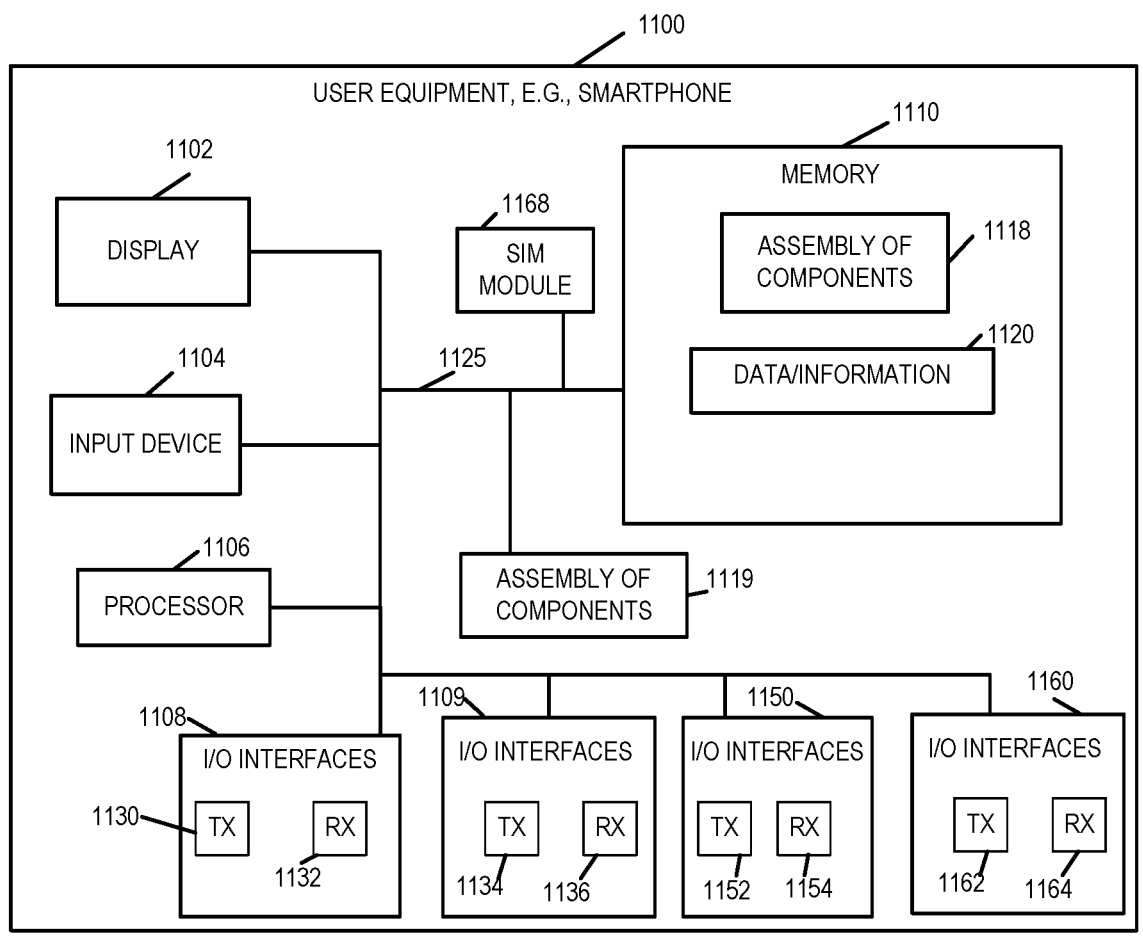
FIG. 11 shows an exemplary user equipment device according to embodiments of the present invention.

FIG. 11 illustrates an exemplary embodiment of a user equipment device 1100, e.g., a smartphone, in accordance with the present invention. Exemplary user equipment device 1100 includes a display 1102, an input device 1104, a processor 1106, e.g., a CPU, input/output (I/O) interfaces 1108, 1109, 1150, 1160, which couple the user equipment device to networks and/or various other devices including for example base stations and access points, memory 1110, and an assembly of components 1119, e.g., circuits corresponding to different components, a SIM module 1168 coupled together via a bus 1125 over which the various elements may exchange data and information. Memory 1110 includes an assembly of components 1118, e.g., an assembly of software components, data/information 1120. The I/O interfaces 1108 include transmitters 1130 and receivers 1132. The I/O interfaces 1109 include transmitters 1134 and receivers 1136. The I/O interfaces 1150 include transmitters 1152 and receivers 1154. The I/O interfaces 1160 include transmitters 1162 and receivers 1164. The user equipment device 1100 is also configured to have a plurality of Internet Protocol (IP) address/port number pairs, e.g., logical IP address/port pairs, for use in exchanging signaling information, e.g., SIP signaling messages for establishing media sessions, and media, e.g., Real-time Transport Protocol packets of a media session.

The I/O interfaces and transmitters and receivers included therein in some embodiments are configured to communicate in accordance with cellular network protocol, the Internet Protocol, Transport Control Protocol (TCP), User Datagram Protocol (UDP), Session Initiation Protocol (SIP), Session Description Protocol (SDP). In some embodiments, the user equipment device 1100 includes a communication component configured to operate using one or more cellular, IP, TCP, UDP, SIP, and SDP protocols. In some embodiments, the communication component is a hardware component, a software component or a component including hardware and software components.

In some embodiments, the exemplary user equipment device 410 illustrated in FIG. 4 is implemented in accordance with the description of the user equipment device 1100 illustrated in FIG. 11. In some such embodiments, the 3rd party data application 411 is implemented as a software component in the assembly of software components 1118 in memory 1110 which is a set of instructions that are executed by processor 1106. In some embodiments, the 3rd party application is implemented as a combination of software components 1118 and/or hardware components, e.g., circuits, 1119. In some embodiments, the user equipment device sends and receives communication signals via Interfaces 1108, 1109, 1150 and 1160, e.g., to the mobile operator secure network 413 over communications links and via the Internet. In some embodiments the 3rd party data 312 is stored in data/information 1120 of memory 1110.

Figure 12:
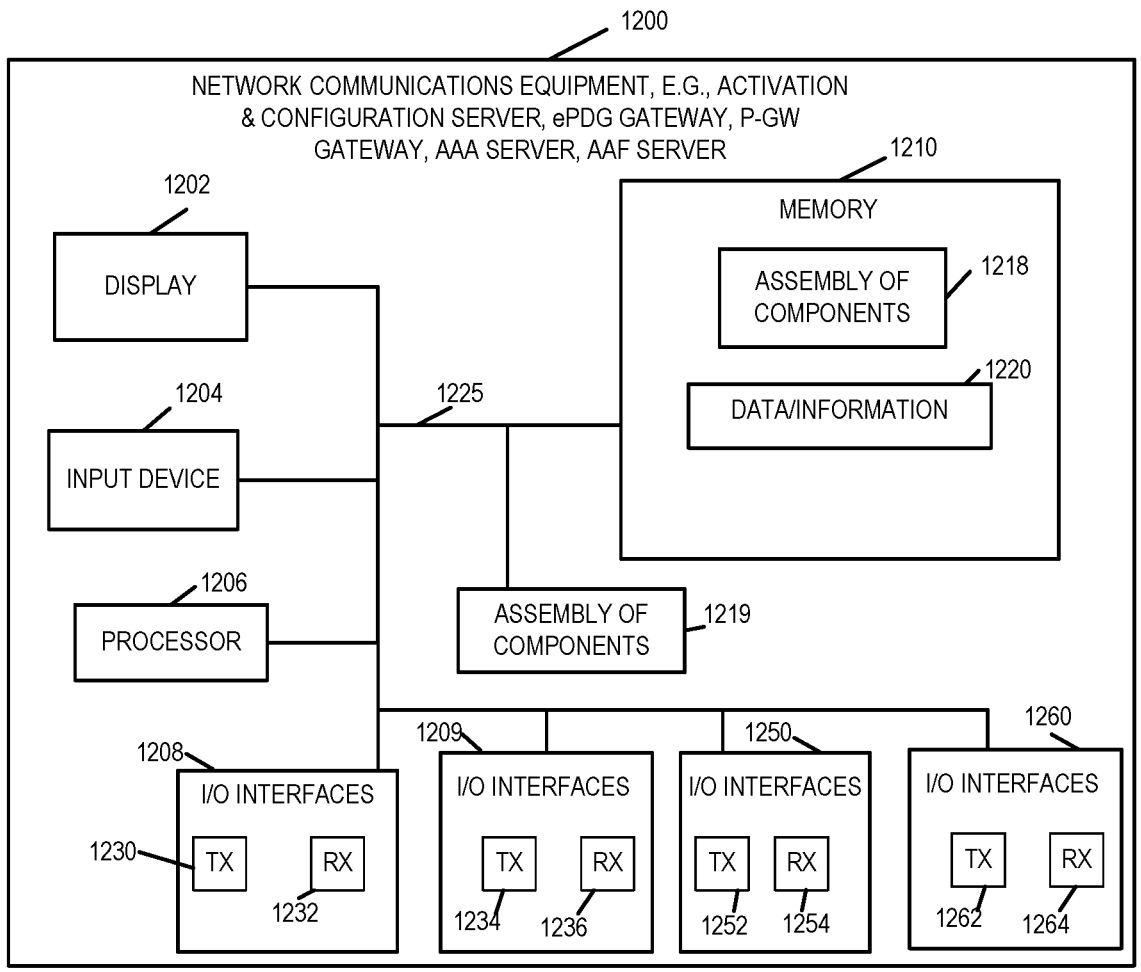
FIG. 12 shows an exemplary network device according to embodiments of the present invention.

FIG. 12 illustrates an exemplary embodiment of a network communications equipment device 1200, e.g., activation & configuration server, ePDG gateway, P-GW gateway, AAA server, DRA server, AAF server in accordance with the present invention. Exemplary network equipment device 1200 includes an optional display 1202, an input device 1204, a processor 1206, e.g., a CPU, input/output (I/O) interfaces 1208, 1209, 1250, 1260, which couple the network communications device to networks and/or various other devices including for example base stations and access points, user equipment devices, memory 1210, and an assembly of components 1219, e.g., circuits corresponding to different components, coupled together via a bus 1225 over which the various elements may exchange data and information. Memory 1210 includes an assembly of components 1218, e.g., an assembly of software components, data/information 1220. The I/O interfaces 1208 include transmitters 1230 and receivers 1232. The I/O interfaces 1209 include transmitters 1234 and receivers 1236. The I/O interfaces 1250 include transmitters 1252 and receivers 1254. The I/O interfaces 1260 include transmitters 1262 and receivers 1264. The user equipment device 1200 is also configured to have a plurality of Internet Protocol (IP) address/port number pairs, e.g., logical IP address/port pairs, for use in exchanging signaling information, e.g., SIP signaling messages for establishing media sessions, and media, e.g., Real-time Transport Protocol packets of a media session.

In some embodiments, the exemplary Activation & Configuration Server 420 illustrated in FIG. 4 is implemented in accordance with the description of the network communications equipment device 1200 illustrated in FIG. 12. In some such embodiments, the steps of the method performed by the Activation & Configuration Server 420 described above are implemented in one or more software components in the assembly of software components 1218 in memory 1210 which include one or more sets of instructions that are executed by processor 1206. In some embodiments, the steps are implemented as a combination of software components 1218 and/or hardware components, e.g., circuits, 1219. In some embodiments, the Activation & Configuration Server when implemented in accordance with the network equipment device 1200 sends and receives communication signals via Interfaces 1208, 1209, 1250 and 1260, e.g., to and from UDB 421 and the user device 410 over communications links and/or via the Internet.

Similarly, the ePDG 530, AAA #1 510-1, AAA #2 510-2, AAA 610, DRA 710, AAF 910, P-GW 140, EPC 150 apparatus/devices may be, and in some embodiments are, implemented in accordance with the description of the network communications equipment device 1200 illustrated in FIG. 12. In some such embodiments, the steps of the method and/or functions performed by each of the aforementioned apparatus/devices as described above are implemented in one or more software components in the assembly of software components 1218 in memory 1210 which include one or more sets of instructions that are executed by processor 1206. In some embodiments, the functions and/or steps are implemented as a combination of software components 1218 and/or hardware components, e.g., circuits, 1219.

Figure 13A:
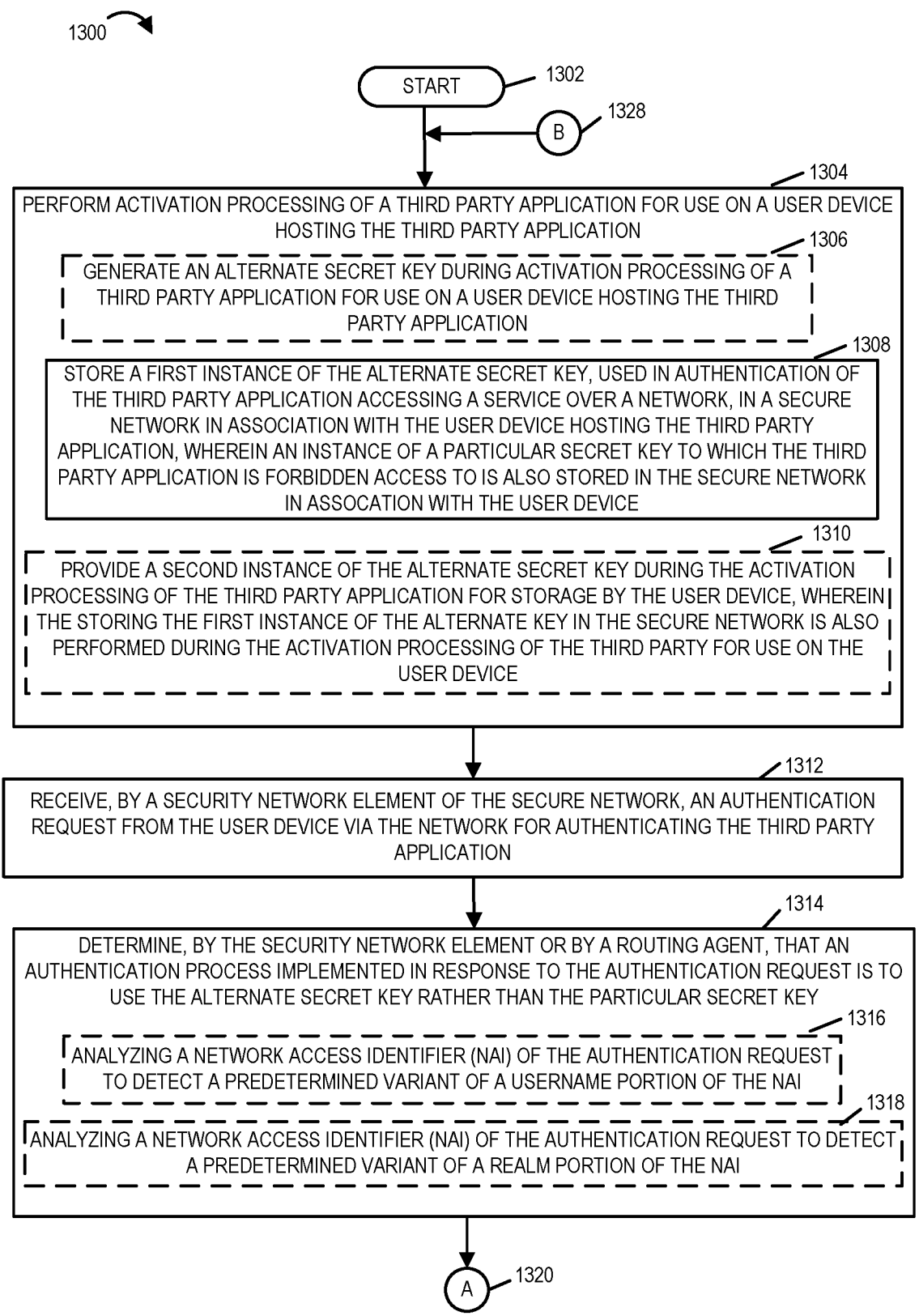
FIG. 13A shows a first part of a flowchart of an exemplary method in accordance with embodiments of the present invention.

FIG. 13 illustrates a flowchart of an exemplary method 1300 in accordance with an embodiment of the present invention. FIG. 13 includes the combination of FIGS. 13A and 13B. FIG. 13A illustrates the first part of the flowchart of the method 1300 of FIG. 13. FIG. 13B illustrates the second part of the flowchart of the method 1300 of FIG. 13.

The method 1300 may be, and in some embodiments is, implemented using the communications system elements illustrated in FIGS. 4, 5, 6, 7, and/or 9. In some embodiments, the steps of method 1300 are performed by one or more network equipment devices which may be implemented in accordance with the network equipment device 1200 of FIG. 12 and/or the UE device 410.

Method 1300 shown on FIG. 13A begins in start step 1302 where operation proceeds from step 1302 to step 1304.

In step 1304 a network equipment device, e.g., a Activation and Configuration Server, performs activation processing of a third party application for use on a user equipment device (UE) hosting the third party application. Step 1304 includes sub-step 1306, 1308 and 1310. Sub-steps 1306 and 1308 are optional and are not included in all embodiments of the invention.

In sub-step 1306, an alternate secret key is generated during the activation processing of the third party application for use on a user device hosting the third party application. Operation proceeds from sub-step 1306 to sub-step 1308.

In sub-step 1308, a first instance of the alternate secret key used in authentication of the third party application accessing a service over a network is stored in a secure network in association with the UE hosting the third party application. Within the secure network an instance of a particular secret key to which the third party application is forbidden access to is also stored in association with the user device. Operation proceeds from sub-step 1308 to sub-step 1310.

In sub-step 1310, a second instance of the alternate secret key is provided to the UE during the activation processing of the third party application for storage by the UE. In some embodiments, the instance of the particular secret key to which the third party application is forbidden access to is stored in a subscriber identity module (SIM) of the user device. In some embodiments a copy of the particular secret key to which the third party application is forbidden access is stored in an authentication center (AuC) in the secure network. In some embodiments, the first instance of the alternative secret key is stored in a user database (UDB) of the secure network and the second instance of the alternative secret key is stored in a configuration database for the third party application in the user device. Operation proceeds from step 1308 to step 1312.

In step 1312, a security network element/device of the secure network receives an authentication request from the third party application of the UE via the network for authenticating the third party application. The authentication request may, and typically does, include information for facilitating a determination that an authentication process implemented in response to the authentication request is to use the alternate secret key rather than the particular secret key. Operation proceeds from step 1312 to step 1314.

In step 1314, the security network element or a routing agent determine that an authentication process implemented in response to the authentication request is to use the alternate secret key rather than the particular secret key. In some embodiments step 1314 includes one or more optional sub-steps 1316 and 1318.

In sub-step 1316, the second network element or the routing agent whichever is performing the determination step analyzes a network access identifier (NAI) of the authentication request to detect a predetermined variant of username portion of the NAI.

In sub-step 1318, the second network element or the routing agent which is performing the determination step analyzes the network access identifier (NAI) of the authentication request to detect a predetermined variant of a realm portion of the NAI.

Operation proceeds from step 1314 to optional step 1322 shown on FIG. 13B via connection node B 1320. In step 1322, a backend authentication system obtains authentication credentials including the first instance of the alternate secret key based on the determining step. In some embodiments, the authentication credentials are obtained from a user database, e.g., UDB 421, maintained in the secure network. Operation proceeds from step 1322 to step 1324. If optional step 1322 is not implemented, operation proceeds directly from step 1314 to step 1324.

In step 1324, the backend authentication system of the secure network performs authentication processing for the third party application using the first instance of the alternate secret key in response to the determining step. Operation proceeds from step 1324 to step 1326. In step 1326, after successful completion of the authentication processing authenticating the third party application allow the third party application to access the service over the network. In some embodiments, step 1326 is optional. Operation proceeds from step 1326 via connection node B 1328 to step 1304 where activation processing of another application for the same UE or a different UE begins and the steps of method 1300 are repeated. When step 1326 is not performed operation proceeds from step 1324 via connection node B 1328 to step 1304.

In some embodiments, the authentication processing includes an extensible authentication protocol-authentication key agreement (EAP-AKA) process or extensible authentication protocol-(GSM) subscriber identity module (EAP-SIM) process performed by network elements, components, and/or devices in the secure network operable to perform the EAP-AKA or EAP-SIM process using the particular secret key.

In some embodiments, the security network element comprises an evolved Packet Data Gateway (ePDG) using at least one of an EAP-AKA protocol, an EAP-AKA protocol, or an EAP-SIM protocol for SIM-based devices, or a Security Gateway (SeGW) using at least one of an EAP-AKA protocol or EAP-SIM protocol for SIM-based devices.

In some embodiments in which the security network element performs the steps of receiving the authentication request and the step of determining that the authentication process is to use the alternate secret key and wherein the step of authentication processing is performed by a backend authentication system of the secure network, the method 1300 further includes the step routing information of the authentication request by the security network element to the backend authentication system based on the determining performed by the security network element. In some such embodiments, the backend authentication system comprises a backend authentication device of a plurality of backend authentication devices in communication with the security network element, wherein the backend authentication device is operable to authenticate the third party application using the alternative secret key, and wherein another backend authentication device of the plurality of backend authentication devices comprises a backend authentication device operable to authenticate native applications using the particular secret key to which the third party application is forbidden access to. In some such embodiments, the backend authentication systems include one or more authentication, authorization, and accounting (AAA) servers which are backend authentication devices. In some such embodiments, the backend authentication system includes an authentication key agreement assist function (AAF) adapted only to perform authentication processing which allows it to be less technologically complex and less expensive than an AAA server as it only has to perform authentication processing.

In some embodiments in which the authentication request is performed by a security network element of the secure network, e.g., an ePDG or SeGW using an EAP-AKA EAP-SIM protocol for SIM-based devices, the determining that the authentication process is to use the alternate secret key step is performed by a routing agent, e.g., a DIAMETER routing agent (DRA) server, and the backend authentication system includes an AAA server, the method 1300 further includes obtaining authentication credentials including the first instance of the alternate secret key by the routing agent based on the determining. In some such systems the routing agent is in communication with a user database (USB) storing the first instance of the alternate secret key and also in communication with an authentication center (AuC) storing an instance of the particular secret key to which the third party application is forbidden access to.

In some embodiments the network over which the third party application is accessing a service is a trusted network while in other embodiments the network is an untrusted network.

It should be appreciated that the alternate secret key provided to the UE during the third party application activation process is transmitted over a secure channel such as for example via a Transport Layer Security (TLS) security association established between the UE and the Activation and Configuration Server. The secure channel being established prior to or during the third party activation process.

It should be appreciated that, although various blocks and/or components relevant to the disclosure herein have been shown with respect to the illustrated embodiments of an authentication procedure, such as an EAP-AKA procedure, to be used within the standard network security architecture to authenticate third party applications, additional or alternative blocks and/or components may be utilized within the scope of the concepts herein. Any or all blocks and/or components of embodiments may be implemented at least partially in software (as one or more instruction sets) adapted for execution by a processor of the processor-based system. When implemented in software, elements of embodiments of the present invention are essentially code segments operable upon the processor. Such program or code segments can be stored in a computer readable medium, such as RAM, ROM, a storage device, etc. Additionally or alternatively, the code segments may be downloaded via one or more networks, such as a cellular or data network.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, the scope of the present application is not intended to be limited to the particular embodiments of the process, machine, manufacture, composition of matter, means, methods and steps described in the specification.

The techniques of various embodiments may be implemented using software, hardware (e.g., circuitry) and/or a combination of software and hardware. Various embodiments are directed to apparatus, e.g., a user equipment device such as a mobile phone, smartphone, laptop, etc. or a network communications device such as for example a ePDG gateway, AAA server, AAF server, etc. Various embodiments are also directed to methods, e.g., a method of operating a user communications device such as a mobile phone, smartphone, etc. or a network equipment device such as for example an ePDG gateway, AAA server, AAF server, etc. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments applications described herein are implemented using one or more components to perform the steps corresponding to one or more methods, for example, storing a first instance of an alternate secret key in a secure network, receiving an authentication request from a user device via the network for authenticating a third party application, determining that an authentication process implemented in response to an authentication request is to use an alternate secret key rather than a different secret key, performing authentication processing for a third party application using a first instance of an alternate secret key in response to a determining step, generating an alternate secret key during activation processing of a third party application for use on a user device, signal transmission, signal reception, signal processing, and/or other steps. Thus, in some embodiments various features are implemented using components. Such components may be implemented using software, hardware (e.g., circuitry) or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to an apparatus, e.g., a communications device such as a mobile phone, smartphone, laptop, etc., including a processor configured to implement one, multiple or all of the steps of one or more methods of the invention.

In some embodiments, the processor or processors, e.g., CPUs, of one or more devices, e.g., of the communications device, e.g., a mobile phone, smartphone, etc. or network device are configured to perform the steps of the methods described as being performed by the apparatus or to control the apparatus to perform the steps. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., such as communications device, e.g., a mobile phone, smartphone, etc. or network device with a processor which includes a component corresponding to each of the steps of the various described methods performed by the device in which the processor is included. In some, but not all embodiments, an apparatus, e.g., a communications device, e.g., a mobile phone, smartphone, mobile phone, etc. or network device includes a component corresponding to each of the steps of the various described methods performed by the device in which the processor is included. The components may be implemented using software and/or hardware (e.g., circuitry).

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device, e.g., a mobile phone, smartphone, etc. or network device The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed:

1. A method comprising:
   storing a first instance of an alternate secret key, used in authentication of a third party application accessing a service over an access network, in a secure network in association with a user device hosting the third party application, wherein an instance of a particular secret key to which the third party application is forbidden access to is also stored in the secure network in association with the user device;
   receiving, at an authentication, authorization, and accounting (AAA) server located in the secure network, an authentication request from the user device via the access network;
   determining, by the AAA server, whether an authentication process implemented in response to the authentication request is to use the alternate secret key or the particular secret key based on information contained in the authentication request; and when the AAA server determines that the alternate secret key is to be used performing, by the AAA server, authentication processing using the first instance of the alternate secret key;

receiving, at an activation and configuration server located in the secure network, an activation request from the third party application hosted on the user device prior to said storing the first instance of the alternate secret key in the secure network;

generating, by the activation and configuration server, in response to the receipt of the activation request from the third party application the alternate secret key for use by the user device; and communicating, by the activation and configuration server, a second instance of the alternate secret key to the user device for use by the third party application.

2. The method of claim 1, wherein when said AAA server determines that the particular secret key is to be used performing, by the AAA server, authentication processing using the instance of the particular secret key.

3. The method of claim 1, wherein said information contained in the authentication request upon which said determination is based includes one or more of the following: a username portion of a Network Address Identifier included in the authentication request or a realm portion of the Network Address Identifier included in the authentication request.

4. The method of claim 1, wherein said third party application is one of the following: a Voice Calling over Wi-Fi application, a Video Calling over Wi-Fi application or an application supporting Rich Communications Services.

5. The method of claim 1, wherein said access network is an untrusted network.

6. The method of claim 1, wherein the authentication processing comprises an extensible authentication protocol-authentication key agreement (EAP-AKA) process or extensible authentication protocol-subscriber identity module (EAP-SIM) process.

7. The method of claim 6, wherein the instance of the particular secret key to which the third party application is forbidden access to is a subscriber identity module based secret key.

8. The method of claim 1 further comprising:
sending configuration data to the user device in response to the activation request from the third party application, said configuration data including the second instance of the alternate secret key and data for configuring the third party application for use with the secure network.

9. The method of claim 1, wherein said second instance of the alternate secret key is communicated to the user device over a secure connection established using the particular secret key.

10. A system comprising:
a first storage device located in a secure network in which a first instance of an alternate secret key, used in authentication of a third party application accessing a service over an access network, is stored in association with a user device hosting the third party application;
a second storage device located in the secure network in which an instance of a particular secret key to which the third party application is forbidden access to is stored in association with the user device;
an authentication, authorization, and accounting (AAA) server located in the secure network that is adapted to receive an authentication request from the user device via the access network;
wherein said AAA server is further adapted to determine whether an authentication process implemented in response to the received authentication request is to use the alternate secret key or the particular secret key based on information contained in the authentication request and when the AAA server determines that the alternate secret key is to be used performing, by the AAA server, authentication processing using the first instance of the alternate secret key; and
an activation and configuration server located in the secure network adapted to receive an activation request from the third party application hosted on the user device prior to the first instance of the alternate secret key being stored in the first storage device; and
wherein said activation and configuration server is further adapted to:
(i) generate in response to the receipt of the activation request from the third party application the alternate secret key for use by the user device,
(ii) store the first instance of the alternate secret key in the first storage device, and
(iii) communicate a second instance of the alternate secret key to the user device for use by the third party application hosted on the user device.

11. The system of claim 10, wherein when said AAA server determines that the particular secret key is to be used performing, by the AAA server, authentication processing using the instance of the particular secret key.

12. The system of claim 10, wherein said information contained in the authentication request upon which said determination is based includes one or more of the following: a username portion of a Network Address Identifier included in the authentication request or a realm portion of the Network Address Identifier included in the authentication request.

13. The system of claim 10, wherein said third party application is one of the following: a Voice Calling over Wi-Fi application, a Video Calling over Wi-Fi application or an application supporting Rich Communications Services.

14. The method of claim 10, wherein said access network is an untrusted network.

15. The system of claim 10, wherein the authentication processing comprises an extensible authentication protocol-authentication key agreement (EAP-AKA) process or extensible authentication protocol-subscriber identity module (EAP-SIM) process.

16. The system of claim 15, wherein the instance of the particular secret key to which the third party application is forbidden access to is a subscriber identity module based secret key.

17. The system of claim 10, wherein said second instance of the alternate secret key is communicated to the user device over a secure connection established using the particular secret key.

18. A method of operating a user device comprising:
downloading from a server by the user device a third party application for accessing a service over an access network;
restricting said third party application from accessing an instance of a particular secret key stored in a subscriber identity module of the user device;
transmitting from the third party application of the user device to an activation and configuration server located in a secure network via the access network an activation request;
receiving, from said activation and configuration server in response to said activation request, a first instance of an alternate secret key for use by the third party application, said alternate secret key having been generated by said activation and configuration server in response to the activation request from the third party application for use by the user device with the first instance of the generated alternate secret key being communicated to the user device and a second instance of the generated alternate secret key being stored in the secure network; and using the alternate secret key to authenticate the third party application to a network device located in the secure network.

19. The method of claim 18, wherein said third party application is one of the following: a Voice Calling over Wi-Fi application, a Video Calling over Wi-Fi application or an application supporting Rich Communications Services.

20. The method of claim 18,
wherein said access network is an untrusted network; and
wherein said first instance of the alternate secret key is received by the user device over a secure connection established using the particular secret key.

* * * * *